US 9,261,376 B2

(12) United States Patent
Zheng et al.

(10) Patent No.: US 9,261,376 B2
(45) Date of Patent: Feb. 16, 2016

(54) ROUTE COMPUTATION BASED ON ROUTE-ORIENTED VEHICLE TRAJECTORIES

(75) Inventors: Yu Zheng, Beijing (CN); Yin Lou, Shanghai (CN); Chengyang Zhang, Beijing (CN); Xing Xie, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 545 days.

(21) Appl. No.: 12/712,053

(22) Filed: Feb. 24, 2010

(65) Prior Publication Data
US 2011/0208429 A1   Aug. 25, 2011

(51) Int. Cl.
G01C 21/36 (2006.01)
G01S 19/42 (2010.01)
G06F 17/30 (2006.01)
G01C 21/34 (2006.01)

(52) U.S. Cl.
CPC ............ *G01C 21/3484* (2013.01); *G01S 19/42* (2013.01)

(58) Field of Classification Search
CPC ........ G01C 21/10; G01C 21/16; G01C 21/26; G01C 21/3484; G01S 19/42
USPC ......... 701/201, 209, 213, 400, 408, 468, 446, 701/527, 533
See application file for complete search history.

(56) References Cited

U.S. PATENT DOCUMENTS

| 5,428,546 A | 6/1995 | Shah et al. |
| 5,802,492 A | 9/1998 | DeLorme et al. |
| 5,845,227 A | 12/1998 | Peterson |

(Continued)

FOREIGN PATENT DOCUMENTS

| EP | 1087602 A2 | 3/2001 |
| EP | 1087605 A2 | 3/2001 |

(Continued)

OTHER PUBLICATIONS

Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.

(Continued)

*Primary Examiner* — Redhwan K Mawari
*Assistant Examiner* — Rodney P King
(74) *Attorney, Agent, or Firm* — Sandy Swain; Micky Minhas; Lee & Hayes, PLLC

(57) ABSTRACT

Techniques for providing a route based on route-oriented vehicle trajectories are described. This disclosure describes receiving GPS logs and extracting route-oriented vehicle trajectory content from the GPS log data to pertain to a single trip. Next, the process maps each route-oriented vehicle trajectory to a corresponding road segment to construct a landmark graph. A landmark is a road segment frequently visited by route-oriented vehicles. The process includes receiving a user query with a starting point and a destination point; searching the landmark graph for a sequence of landmarks with corresponding transition times and a least amount of travel time. Then the process identifies and connects sets of road segments between each pair of consecutive landmarks, and displays a route to a user with a nearest landmark to the starting point, other landmarks along the route, and another nearest landmark to the destination point.

20 Claims, 10 Drawing Sheets

(56) References Cited

U.S. PATENT DOCUMENTS

| | | |
|---|---|---|
| 5,904,727 A | 5/1999 | Prabhakaran |
| 6,023,241 A | 2/2000 | Clapper |
| 6,091,359 A | 7/2000 | Geier |
| 6,091,956 A | 7/2000 | Hollenberg |
| 6,122,628 A | 9/2000 | Castelli et al. |
| 6,128,279 A | 10/2000 | O'Neil et al. |
| 6,219,662 B1 | 4/2001 | Fuh et al. |
| 6,243,647 B1 | 6/2001 | Berstis et al. |
| 6,317,684 B1 | 11/2001 | Roeseler et al. |
| 6,317,686 B1 | 11/2001 | Ran |
| 6,351,775 B1 | 2/2002 | Yu |
| 6,356,838 B1 | 3/2002 | Paul |
| 6,385,539 B1 | 5/2002 | Wilson et al. |
| 6,411,897 B1 | 6/2002 | Gaspard, II |
| 6,424,370 B1 | 7/2002 | Courtney |
| 6,427,122 B1 | 7/2002 | Lin |
| 6,430,547 B1 | 8/2002 | Busche et al. |
| 6,446,121 B1 | 9/2002 | Shah et al. |
| 6,493,650 B1 | 12/2002 | Rodgers et al. |
| 6,496,814 B1 | 12/2002 | Busche |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,615,130 B2 | 9/2003 | Myr |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| 6,904,160 B2 | 6/2005 | Burgess |
| 6,919,842 B2 | 7/2005 | Cho |
| 6,925,447 B2 | 8/2005 | McMenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,801,842 B2 | 9/2010 | Dalton |
| 7,840,407 B2 | 11/2010 | Strope et al. |
| 7,860,891 B2 | 12/2010 | Adler et al. |
| 7,904,530 B2 | 3/2011 | Partridge et al. |
| 7,920,965 B1 * | 4/2011 | Nesbitt et al. ................. 701/416 |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,060,462 B2 | 11/2011 | Flinn et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 | 7/2012 | Youssef et al. |
| 8,275,649 B2 | 9/2012 | Zheng et al. |
| 8,458,298 B2 | 6/2013 | Josefsberg et al. |
| 8,562,439 B2 | 10/2013 | Shuman et al. |
| 8,577,380 B2 | 11/2013 | Frias Martinez et al. |
| 9,009,177 B2 | 4/2015 | Zheng et al. |
| 2001/0029425 A1 | 10/2001 | Myr |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |

(56) References Cited

U.S. PATENT DOCUMENTS

| | | |
|---|---|---|
| 2006/0143442 A1 | 6/2006 | Smith |
| 2006/0149464 A1* | 7/2006 | Chien ..................... 701/209 |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1* | 7/2006 | Karaoguz et al. ........ 340/539.13 |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1* | 9/2006 | Sheha et al. ................ 701/209 |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1* | 12/2008 | Poltorak ..................... 701/202 |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1* | 3/2009 | Van Buer ..................... 701/210 |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1* | 12/2009 | Johnson ..................... 701/201 |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0176000 A1 | 7/2011 | Budge et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0117713 A1 | 4/2015 | Zheng et al. |
| 2015/0186389 A1 | 7/2015 | Zheng et al. |

FOREIGN PATENT DOCUMENTS

| | | |
|---|---|---|
| GB | 2421653 | 6/2006 |
| JP | 2002140362 | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A1 | 4/2009 |
| WO | WO2010062726 A2 | 6/2010 |

OTHER PUBLICATIONS

Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=2870I6708I0I10140I2I2I0I0I0I0I266I438I0.1.1I2I0&bav=on.2,or.r_gc.r_pw.,cf.osb&fp=533a712cc6ce8ba0&biw=1280&bih=808>>, 2008, pp. 1-2.

Hariharan, et al., "Project Lachesis: Parsing and Modeling Location Histories", ACM, In the Proceedings of GIScience, 2004, pp. 106-124.

Office Action for U.S. Appl. No. 12/562,588, mailed on Dec. 8, 2011, Yu Zheng, "Mining Life Pattern Based on Location History", 31 pgs.

Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.

Ye, et al., "Mining Individual Life Pattern Based on Location History," Tenth International Conference on Mobile Data Management: Systems, Services and Middleware, May 18-20, 2009, Taipei, 10 pages.

Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

Gonzalez, Han, Li, Myslinska, Sondag, "Adaptive Fastest Path Computation on a Road Network: A Traffic Mining Approach", retrieved on Dec. 24, 2009 at <<http://www.cs.uiuc.edu/~hanj/pdf/vldb07_hagonzal.pdf>>, Published by VLDB Endowment, Proceedings of Conference on Very Large Data Bases, Novel Data Mining Applications, Sep. 23, 2007, pp. 794-805.

(56) References Cited

OTHER PUBLICATIONS

Kanoulas, Du, Xia, Zhang, "Finding Fastest Paths on A Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.

Borzsonyi, et al., The Skyline Operator, In Proc. ICDE 2001, IEEE Press: 421-430, <<http://ieeexplore.ieee.org/stamp/stamp.jsp?tp=&arnumber=914855>>.

Brauckhoff, et al., Applying PCA for Traffic Anomaly Detection: Problems and Solutions, IEEE, 2009, 5 pages.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Bu, et al., Efficient Anomaly Monitoring Over Moving Object Trajectory Streams, KDD 2009, ACM, 2009, 9 pages.

Chen, et al., GLS-SOD: A Generalized Local Statistical Approach for Spatial Outlier Detection, Proceedings of KDD 2010, ACM, 2010, pp. 1069-1078.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Das, et al., Anomaly Detection and Spatial-Temporal Analysis of Global Climate System, Proceedings of SensorKDD 2009, 9 pages, 2009 ACM.

Eagle, et al., Community Computing: Comparisons between Rural and Urban Societies using Mobile Phone Data, IEEE Social Computing, 144-150, <<http://reality.media.mit.edu/pdfs/Eagle_community.pdf>>.

Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.

Estkowski, No Steiner Point Subdivision Simplification is NP-Complete, In Proceedings of the 10th Canadian Conference on Computational Geometry, pp. 11-20, 1998.

Ge, et al., An Energy-Efficient Mobile Recommender System. In Proc. KDD 2010, ACM Press 2010, <<http://pegasus.rutgers.edu/~kelixiao/papers/An%020Energy-Efficient%20Mobile%20Recommender%20System.pdf>>.

Ge, et al., TOP-EYE: Top-k Evolving Trajectory Outlier Detection, Proceedings of CIKM 2010, Toronto, Canada, 4 pages.

Guehnemann, et al., Monitoring traffic and emissions by floating car data. Institute of transport studies Australia; 2004, <<http://elib.dlr.de/6675/1/its_wp_04-07.pdf>>.

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Lakhina, et al., Diagnosing Network-Wide Traffic Anomalies, In Proceedings of the SIGCOMM 2004 Conference, 12 pages, 2004 ACM.

Lee, et al., Trajectory Clustering: A Partition-and-group Framework, In Proceedings of the 26th ACM SIGMOD International Conference on Management of Data 2007, pp. 593-604, 2007.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, 2010.

Lozano, et al., Spatial-temporal Causal Modeling for Climate Change Attribution, KDD 2009, Paris France, ACM 2009, 10 pages.

Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.

Office Action for U.S. Appl. No. 12/037,347, mailed on Aug. 17, 2011, Yu Zheng, "System for Logging Life Experiences Using Geographic Cues", 9 pgs.

Pelekis, et al., Unsupervised Trajectory Sampling, Proceedings of the European Conference on Machine Learning and Principles and Practice of Knowledge Discovery in Databases ECML PKDD 2010, pp. 17-33, 2010.

Ringberg, et al., Sensitivity of PCA for Traffic Anomaly Detection, SIGMETRICS 2007, pp. 109-120.

Rosenfeld, Connectivity in digital pictures. Journal of the ACM (JACM), 17(1):160, 1970.

Rosenfeld, Connectivity in digital pictures, Journal of the ACM 17 (1): pp. 146-160, 1970.

Shekhar, et al., Unified approach to detecting spatial outliers, University of Helsinki 2007, 27 pages, <<http://www.cs.helsinki.fi/u/leino/opetus/spatial-k07/maksimainen.pdf>>.

Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.

Sun, et al., On Local Spatial Outliers, Technical Report No. 549, Jun. 2004, <<http://sydney.edu.au/engineering/it/research/tr/tr549.pdf>>, 9 pages.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Yan, et al., Discovery of frequent substructures, Wiley-Interscience, 2007, 99-113.

Yuxiang, et al., Detecting Spatio-temporal Outliers in Climate Dataset: A Method Study, IEEE 2005, pp. 760-763.

Zhang, et al., iBAT: Detecting Anomalous Taxi Trajectories from GPS Traces, Proceedings of UbiComp Sep. 2011, 10 pages.

Zhang, et al., Network Anomography, USENIX Association, Internet Measurement Conference 2005, pp. 317-330.

Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.

Zheng, et al., Recommending friends and locations based on individual location history. In ACM Transaction on the Web, 2011, 44 pages, <<http://research.microsoft.com/pubs/122435/RecomFriend-zheng-Published.pdf>>.

Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

(56) References Cited

OTHER PUBLICATIONS

Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.

Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/ieI5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.

Amato, et al., "Region Based Image Similarity Search Inspired by Text Search", Third Italian Research Conference on Digital Library Systems, Padova, Italy, Jan. 29-30, 2007, pp. 78-85.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

"Bikely Reviews", website, 2010, 1 page, retrieved on Apr. 16, 2010 at <<http://www.bikely.com/>>.

Bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.

Brakatsoulas, et al., "On Map-Matching Vehicle Tracking Data", VLDB Endowment, In the Proceedings of the 31st International Conference on Very Large Data Bases, Sep. 2005, pp. 853-864.

Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.

Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.

Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chawathe, "Segment-Based Map Matching", In the Proceedings of the IEEE Intelligent Vehicles Symposium, Jun. 13, 2015, pp. 1190-1197.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439__Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.

Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.

Datta, et al., "Image Retrieval: Ideas, Influences, and Trends of the New Age", ACM Computing Surveys, vol. 40, No. 2, Article 5, Apr. 2008, pp. 1-60.

Deerwester, et al., "Indexing by Latent Semantic Analysis", J. Amer. Soc. Info. Sci., vol. 41, No. 6, Jan. 1990, 34 pages.

Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.

Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.

Eagle et al, "Reality mining: sensing complex social systems", Springer-Verlag London, Personal and Ubiquitous Computing, vol. 10, Issue 4, Mar. 2006, pp. 255-268.

Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.

Faloutsos et al, "Fast Subsequence Matching in Time-Series Databases," Proceedings of the 1994 ACM SIGMOD International Conference on Management of Data , vol. 23, No. 2, Jun. 1994, 11 pgs.

Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.

Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.

Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.

Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.

(56) References Cited

OTHER PUBLICATIONS

Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.

Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.

"GPS Track Route Exchange Forum", 2010 GPSXchange.com website, 3 pages, retrieved on Apr. 16, 2010 at <<http://www.gpsxchange.com/phpBB2/index.php>>.

"GPS-Waypoints", retrieved on Apr. 15, 2010 at <<http://www.gps-waypoints.net/>>, 2010, pp. 1.

Greenfeld, "Matching GPS Observations to Locations on a Digital Map", In the Proceedings of the 81st Annual Meeting of the Transportation Research Board, Washington DC, Jan. 2002, 13 pgs.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.

Guttman, "R-Trees: A Dynamic Index Structure for Spatial Searching", retrieved on Apr. 15, 2010 at <<http://www.google.co.in/url?sa=t&source=web&ct=res&cd=1&ved=OCAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0_AaCplCHDQ&usg=AFQjCNFtQttNVHCKYJQZcH052-KmCxIZ0g>>, ACM, Proceedings of Conference on Management of Data,1984, pp. 47-57.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu/~joh/csci8715/p6.pdf>>, Computer Science Department, University of Minnesota, 2004, pp. 1-8.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.

Kavouras, et al., "A Method for the Formalization and Integration of Geographic Categorizations", Draft version from the International Journal of Geographic Information Science, vol. 16, No. 5, 2002, pp. 439-453.

Ke, et al., "Correlated Pattern Mining in Quantitative Databases", ACM Transactions on Database Systems, vol. V, No. N, Apr. 2008, 44 pages.

Ke, et al., "Efficient Correlations Search from Graph Databases", IEEE Transactions on Knowledge and Data Engineering, vol. 20, Issue 12, Dec. 2008, pp. 1601-1615.

Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.

Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.

Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.

Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.

Li, et al., "A Connectivity-Based Map Matching Algorithm", AARS, Asian Journal of Geoinformatics, 2005, vol. 5, No. 3, pp. 69-76.

Li et al., "Mining User Similarity Based on Location History", ACM Conference on Advances in Geographic Information Systems (ACM GIS 2008), Irvine, California, Nov. 5-7, 2008, Article 34, 10 pages, retrieved on Apr. 16, 2010 at <<http://research.microsoft.com/pubs/74369/Mining%20user%20similarity%20based%20on%20location%20history.pdf>>.

Li, et al., "Traffic Density-Based Discovery of Hot Routes in Road Networks", Springer-Verlag, Advances in Spatial and Temporal Databases, 2007, pp. 441-459.

(56) References Cited

OTHER PUBLICATIONS

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao et al., "Learning and Inferring Transportation Routines", Elsevier, Artificial Intelligence, vol. 171, Issues 5-6, Apr. 2007, pp. 311-331.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf, ACM Proceedings of Conference on Knowledge Discovery and Data Mining (KDD), Aug. 22, 2004, pp. 236-245.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1966, vol. 9, No. 3, pp. 275-280.

Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.

Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.

Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.

Popivanov, et al., "Similarity Search Over Time-Series Data Using Wavelets", Proceedings of the 18th International Conference on Data Engineering (ICDE'02), IEEE Computer Society, San Jose, CA, Feb. 26-Mar. 1, 2002, 10 pages.

Quddus, et al. "Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.

Rekimoto, et al., "LifeTag: WiFi-based Continuous Location Logging for Life Pattern Analysis", retrieved on Aug. 4, 2009 at >>http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.

Saltenis, "Outlier Detection Based on the Distribution of Distances between Data Points", retrieved on Dec. 12, 2008 at <<http://www.mii.lt/informatica/pdf/INFO558.pdf>>, INFORMATICA, vol. 15, No. 3, 2004, pp. 399-410.

Salton, et al., "A Vector Space Model for Automatic Indexing", Communications of the ACM, vol. 187, No. 11, Nov. 1975, pp. 613-620.

Salton, "Dynamic Document Processing", Communications of the ACM, vol. 15, Issue 7, Jul. 1972, pp. 658-668.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

"Share My Routes", retrieved on Apr. 15, 2010 at <<http://www.sharemyroutes.com/>>, 2010, pp. 1-2.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.

(56) References Cited

OTHER PUBLICATIONS

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icmI03.pdf>>.

Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Takeuchi et al., "An Outdoor Recommendation System Based on User Location History", Proceedings of the 1st International Workshop on Personalized Context Modeling and Management for UbiComp Applications (ubiPCMM.2005), Tokyo, Japan Sep. 11, 2005, pp. 91-100, retrieved on Apr. 16, 2010 at <<http://docs.google.com/viewer?a=v&q=cache:YIN-In6ZcXMJ:citeseerx.ist.psu.edu/viewdoc/download%3Fdoi%3D10.1.1.91.813%26rep%3Drep1%26type%3Dpdf+An+outdoor+recommendation+system+based+on+user+location.

Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.

Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=OCAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_WuY-VhWeDjIPYpgxv1Q>>, IEEE Computer Society, Proceedings of Conference on Data Engineering (ICDE), 2002, pp. 673-684.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.

Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Winogard, "Dynamic Cartograms for Navigating Geo-referenced Photographs", available at least as early as Nov. 16, 2007, at <<http://cs.stanford.edu/research/project.php?id=289>>, pp. 2.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems.(SIGSPATIAL), OLAP and co-location mining, Article 29, Nov. 5, 2008, pp. 1-10.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yan, et al., "Feature-based Similarity Search in Graph Structures", ACM Transactions on Database Systems, vol. V, No. N, Jun. 2006, 36 pages.

Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.

Yi, Jagadish, Faloutsos, "Efficient Retrieval of Similar Time Sequences under Time Warping", retrieved on Apr. 15, 2010 at <<http://www.google.co.in/url?sa=t&source=web&ct=res&cd=3&ved=0CBYQFjAC&url=http%3A%2F%2Fciteseerx.ist.psu.edu%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5ShA4_0_Aalk5z8DA&usg=AFQjCNEkCq5vQwgb6OQfZmT_RWcgMZ2YNA>>, IEEE Computer.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhao, et al., "Searching for Interacting Features", Proceedings of the 20th International Joint Conference on Artificial Intelligence, Hyderabad, India, Jan. 6-12, 2007, pp. 1156-1161.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.

Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.

Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.

Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.

Zheng et al., "Learning Transportation Mode from Raw GPS Data for Geographic Applications on the Web", ACM Conference on World

(56) References Cited

OTHER PUBLICATIONS

Wide Web (ACM WWW 2008)), Apr. 21, 2008, pp. 247-256, retrieved on Apr. 16, 2010 at <<http://research.microsoft.com/pubs/78567/fp485-Zheng.pdf>>.

Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.

Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.

Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.

Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.

Office action for U.S. Appl. No. 13/324,758, mailed on Jan. 18, 2013, Zheng et al., "Urban Computing of Route-Oriented Vehicles", 48 pages.

Domain Name System (DNS), retrieved on Apr. 29, 2008 at <<http://www.unix.org.ua/orelly/networking/firewall/ch08_10.htm>>, Unix, pp. 1-11.

Domain Name System (DNS) A Guide to TCP/IP, retrieved at <<http://web.syr.edu/~djmolta/ist452/ch_07.ppt>>, Thomson Learning Course Technology, pp. 1-56.

Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.

Eustice et al, "The Smart Party: A Personalized Location Aware Multimedia Experience", Consumer Communications and Networking Conf, Jan. 2008, 5 pgs.

"Flow Control Platform (FCP) Solutions", at <<http://k2colocation.com/network-services/fcp.cfm>>, K2 Colocation, 2005, pp. 2.

"Global Server Load Balancing for Disaster Recovery, Business Continuity, Performance Optimization and Datacenter Management", at <<http://www.zeus.com/documents/en/ZXT/ZXTM_Global_Load_Balancer.pdf>>, Zeus Technology Limited, 1995-2007, pp. 4.

GPS Sharing, retrieved Feb. 4, 2013 at http://web.archive.org/web/20071129224158/http://gpssharing.com, 2 pgs.

Hariharan et al, "NetTrust—Recommendation System for Embedding Trust in a Virtual Realm", ACM Recommender Systems, Oct. 2007, 6 pgs.

Intl Search Report for PCT/US2009/063023, mailed Jun. 10, 2010, 4 pgs.

Jarvelin et al, "Cumulated Gain Based Evaluation of IR Techniques", ACM Transactions on Information Systems, vol. 20, No. 4, Oct. 2002, 25 pgs.

Jones et al, "P3 Systems: Putting the Place Back into Social Networks", IEEE Internet Computing, Sep.-Oct. 2005, 9 pgs.

Lee et al, "Efficient Mining of User Behaviors by Temporal Mobile Access Patterns", Intl Journal of Computer Science and Network Security, vol. 7, No. 2, Feb. 2007, 7 pgs.

Linden et al, "Amazon.com Recommendations, Item to Item Collaborative Filtering", IEEE Internet Computing, Jan. and Feb. 2003, 5 pgs.

Linden, "The End of Federated Search?", at <<http://glinden.blogspot.com/2007/03/end-of-federated-search.html>>, Mar. 24, 2007, pp. 9.

Matsuo et al, "Inferring Long Term User Properties Based on Users' Location History", Proc 20th Intl Joint Conf on Artificial Intelligence, Jan. 2007, 7 pgs.

McDonald et al, "Expertise Recommender: A Flexible Recommendation System and Architecture", CSCW 2000, Dec. 2000, 10 pgs.

Michael et al, "Location Based Intelligence—Modeling Behavior in Humans Using GPS", Proc Intl Symposium on Technology and Society, Jun. 2006, 8 pgs.

Office Action for U.S. Appl. No. 12/041,599, mailed on Jul. 25, 2011, Arne Josefsberg, "Failover in an Internet Location Coordinate Enhanced Domain Name System".

Office action for U.S. Appl. No. 13/188,013, mailed on Nov. 15, 2011, Josefsberg et al., "Internet Location Coordinate Enhanced Domain Name System", 14 pages.

Office action for U.S. Appl. No. 12/353,940, mailed on Feb. 28, 2013, Zheng et al., "Detecting Spatial Outliers in a Location Entity Dataset", 9 pages.

Office Action for U.S. Appl. No. 12/041,599, mailed on Feb. 9, 2012, Arne Josefsberg, "Failover in an Internet Location Coordinate Enhanced Domain Name System", 27 pgs.

Office action for U.S. Appl. No. 12/041,599, mailed on Sep. 21, 2012, Josefsberg et al., "Failover in an Internet Location Coordinate Enhanced Domain Name System", 9 pages.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16.

Sarwar et al, "Application of Dimensionality Reduction in Recommender System, A Case Study", ACM WebKDD Workshop, Aug. 2000, 12 pgs.

Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.

Wikipedia, "Operating System", retrived from <<http://en.wikipedia.org/wiki/Operating_system>> on Oct. 8, 2010, pp. 1-pp. 17.

Xie, "Understanding User Behavior Geospatially", Microsoft Research, Nov. 2008, 2 pgs.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

Ge et al., "An Energy-Efficient Mobile Recommender System", KDD, 2010, 9 pages.

Office action for U.S. Appl. No. 12/712,857, mailed on Aug. 5, 2013, Zheng, et al., "Map-Matching for Low-Sampling-Rate GPS Trajectories", 15 pages.

Office action for U.S. Appl. No. 12/794,538, mailed on Sep. 13, 2013, Zheng, et al., "Searching Similar Trajectories by Locations", 12 pages.

Office action for U.S. Appl. No. 13/324,758, mailed on Jul. 11, 2013, Zheng et al., "Urban Computing of Route-Oriented Vehicles", 47 pages.

European Search Report mailed Nov. 21, 2012 for European patent application No. 09714738.3, 9 pages.

Min-qi, et al., "An Algorithm for Spatial Outlier Detection Based on Delaunay Triangulation", In the Proceedings of the 2008 International Conference on Computational Intelligence and Security, Dec. 2008, pp. 102-107.

Office action for U.S. Appl. No. 12/711,130, mailed on Oct. 4, 2012, Zheng et al., "Mining Correlation Between Locations Using Location History", 15 pages.

Office action for U.S. Appl. No. 12/353,940, mailed on Nov. 2, 2012, Zheng et al., "Detecting Spatial Outliers in a Location Entity Dataset", 11 pages.

Office action for U.S. Appl. No. 12/794,538, mailed on Nov. 29, 2011, Zheng et al. "Searching Similar Trajectories by Locations", 10 pages.

Office action for U.S. Appl. No. 12/567,667, mailed on Dec. 19, 2012, Zheng et al., "Recommending Points of Interests in a Region", 18 pages.

(56) References Cited

OTHER PUBLICATIONS

Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/773,771, mailed on Mar. 26, 2012, Yu Zheng, "Collaborative Location and Activity Recommendations", 9 pgs.
Office Action for U.S. Appl. No. 12/711,130, mailed on Mar. 27, 2012, Yu Zheng, "Mining Correlation Between Locations Using Location History", 14 pgs.
Office Action for U.S. Appl. No. 12/567,667, mailed on Jul. 18, 2012, Zheng et al., "Recommending Points of Interests in a Region", 20 pages.
Shekhar et al., "A Unified Approach to Detecting Spatial Outliers", GeoInformatica 7:2, 2003, 28 pages.
Shekhar, et al., "Data Mining for Selective Visualization of Large Spatial Datasets", In the Proceedings of the 14th IEEE International Conference on Tools with Artificial Intelligence, Nov. 2002, pp. 41-48.
Shiraishi, "A User-centric Approach for Interactive Visualization and mapping of Geo-sensor Data", Networked Sensing Systems, 2007, INSS, Fourth International Conference on IEEE, Jun. 1, 2007, pp. 134-pp. 137.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-pp. 79.
Sun, "Outlier Detection in High Dimensional, Spatial and Sequential Data Sets", School of Information Technologies, The University of Sydney, Sep. 2006, 118 pages.
Tai et al., "Recommending Personalized Scenic Itinerary with Geo-Tagged Photos", ICME, 2008, 4 pages.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-pp. 211.
Weng et al., "Design and Implementation of Spatial-temporal Data Model in Vehicle Monitor-System", Proceeding of the 8th International Conference on Geocomputation, Aug. 3, 2005, pp. 1-pp. 8.
Zhang, et al., "A Taxonomy Framework for Unsupervised Outlier Detection Techniques for Multi-Type Data Sets," Technical Report TR-CTIT-07-79, Centre for Telematics and Information Technology University of Twente, Enschede, Nov. 2007, pp. 1-40.
Office action for U.S. Appl. No. 12/712,857, mailed on Feb. 21, 2014, Zheng, et al., "Map-Matching for Low Sampling-Rate GPS Trajectories", 15 pages.
Office action for U.S. Appl. No. 12/353,940, mailed on Mar. 4, 2014, Zheng, et al., "Detecting Spatial Outliers in a Location Entity Dataset", 10 pages.
Office action for U.S. Appl. No. 12/567,667, mailed on Feb. 25, 2014, Zheng et al., "Recommending Points of Interests in a Region", 31 pages.
Office action for U.S. Appl. No. 12/794,538, mailed on Apr. 22, 2014, Zheng et al., "Searching Similar Trajectories by Locations", 38 pages.
Liao, et al. "Learning and inferring transportation routines", Artificial Intelligence, vol. 171, 2007, pp. 311-331.
Office action for U.S. Appl. No. 12/037,347, mailed on Jan. 13, 2014, Zheng, et al., "System for Logging Life Experiences Using Geographic Cues", 8 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Ashbrook, et al., "Using GPS to Learn Significant Locations and Predict Movement Across Multiple Users", Journal of Personal and Ubiquitous Computer Archive, vol. 7, Issue 5, Oct. 2003, 15 pages.
Breiman, "Bagging Peclictors", Machine Learning, vol. 24, No. 2, Aug. 1996, pp. 123-140.

Chen, et al., "GeoTracker Geospatial and Temporal RSS Navigation", WWW2007, May 2007, pp. 41-50.
"CRF++: Yet Another CRF Toolkit", retrieved on Jan. 18, 2008 from <<http://crfpp.sourceforge.net>>, 13 pages.
European Search Report mailed Jun. 8, 2012 for European patent application No. 09715263.01, 6 pages.
Hadjieleftheriou, et al., "Complex Spatio-Temporal Pattern Queries", Proceedings of the 31st VLDB Conference, Sep. 2005, pp. 877-888.
Hadjieleftheriou, et al., "Efficient Indexing of Spatiotemporal Objects", Proceedings of the 8th International Conference on Extending Database Technology: Advances in Database Technology, Mar. 2002, 10 pages.
Han, et al., "Predicting User' Movement with a Combination of Self-Organizing Map and Markov Model", ICANN 2006, Part II, LNCS 4132, Sep. 2006, pp. 884-893.
International Preliminary Report on Patentability cited in PCT Application No. PCT/US2009/032777 dated Sep. 10, 2010, 6 pages.
Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.
International Search Report and Written Opinion Received for PCT Application No. PCT/US2009/0327777, mailed Aug. 26, 2009, 10 pages.
International Search Report dated Aug. 19, 2009 for PCT Application No. PCT/US2009/032778, filed Jan. 31, 2009, 11 pages.
Lafferty, et al., "Conditional Random Fields: Probabilistic Models for Segmenting and Labeling Sequence Data", Proceedings of the 18th International Conference on Machine Learning, Jun. 2001, 8 pages.
Mitchell, et al., "Six in the City: Introducing Real Tournament—A Mobile IPv6 Based Context-Aware Multiplayer Game", NetGames'03, May 2003, pp. 91-100.
"North York Moors and Yorkshire Wolds Mountain Bke (MTB) Routes", retrieved on Jan. 17, 2008 from http://www.mtb-routs.co.uk/northyorkmorrs/defaultaspx, 4 pages.
Non-Final Office Action for U.S. Appl. No. 12/041,608, mailed on Jun. 25, 2014, Josefsberg, et al., "Client-Side Management of Domain Name Information", 4 pages.
Office Action for U.S. Appl. No. 12/712,857, mailed on Jun. 6, 2014, Yu Zheng, "Map-Matching for Low-Sampling-Rate GPS Trajectories", 14 pages.
"SlamXR List Routes Page by Microsoft Research Community Technologies Group", retrieved on Jan. 18, 2008 from http://www.msslam.com/slamxr/ListRoutes.aspx>, 2 pages.
"SportsDo", retrieved on Jan. 17, 2008 from <<http://sportsdo.net/Activity/ActivityBlog.aspx>>, 3 pages.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the SDDBM'98, Jul. 1998, 10 pages.
Toyama, et al., "Geographic Location Tags on Digital Images", MM'03, Nov. 2003, 11 pages.
"Twittervision", retrieved on Jan. 18, 2008 from <<http://twittervision.com>>, 1 page.
Wasinger, et al., "M3I in a Pedestian Navigation & Exploration System", Proceedings of the Fifth International Symposium on Human Computer Interaction with Mobile Devices, Sep. 2003, 5 pages.
Wei, et al., "A Service-Portlet Based Visual Paradigm for Personalized Convergence of Information Resources", 2nd IEEE International Conference on Computer Science and Information Technology, Aug. 2009, pp. 119-124.

(56) References Cited

OTHER PUBLICATIONS

"Weka 3: Data Mining Software in Java", retreived on Jan. 18, 2008 from <<http://www.cs.waikato.ac.nz/ml/weka/index_home.html>>, 1 page.

"Welcome to WalkJogRun", retreived on Jan. 17, 2008 from <<http://www.walkjogrun.net>>, 1 page.

"WikiWalki Community Trail Guide", retreived on Jan. 17, 2008 from <<http://www.wikiwalki.com>>, 1 page.

Zhang, et al., "Research on Information Fusion on Evaluation of Driver Fatigue", 2008 International Symposium on Computer Scientc and Computational Technology, Dec. 2008, pp. 151-155.

Office Action for U.S. Appl. No. 12/353,940, mailed on Jul. 17, 2014, Yu Zheng, "Detecting Spatial Outliers in a Location Entity Dataset", 10 pages.

Final Office Action for U.S. Appl. No. 12/567,667, mailed on Aug. 27, 2014, Yu Zheng, "Recommending Points of Interests in a Region", 7 pages.

Office action for U.S. Appl. No. 12/794,538, mailed on Aug. 14, 2015, Zheng et al., "Searching Similar Trajectories by Locations," 10 pages.

Office action for U.S. Appl. No. 12/712,857, mailed on Jan. 6, 2015, Zheng, et al., "Map-Matching for Low-Sampling-Rate GPS Trajectories", 15 pages.

Office Action for U.S. Appl. No. 13/324,758, mailed on Dec. 24, 2014, Zheng et al., "Urban Computing of Route-Oriented Vehicles", 54 pages.

Office action for U.S. Appl. No. 12/794,538, mailed on Mar. 23, 2015, Zheng et al., "Searching Similar Trajectories by Locations", 8 pages.

Office action for U.S. Appl. No. 13/324,758, mailed on Jun. 17, 2015, Zheng et al., "Urban Computing of Route-Oriented Vehicles," 38 pages.

Office action for U.S. Appl. No. 14/659,125, mailed on Jun. 19, 2015, Zheng et al., "Recommending Points of Interests in a Region," 7 pages.

Office action for U.S. Appl. No. 12/712,857, mailed on Jun. 25, 2015, Zheng, "Map-Matching for Low-Sampling-Rate GPS Trajectories," 17 pages.

Final Office Action for U.S. Appl. No. 12/712,857, mailed on Oct. 7, 2015, Yu Zheng, "Map-Matching for Low-Sampling-Rate GPS Trajectories", 18 pages.

\* cited by examiner

ROUTE COMPUTATION BASED ON ROUTE-ORIENTED VEHICLE TRAJECTORIES

BACKGROUND

A wide range of map-based services are being offered to users through web browsers, search engines, and as applications. Users may access the map-based services for street maps, a route planner, and a planner for traveling by foot, vehicle, or public transport. Furthermore, the users now have access to an urban business locator for countries around the world.

The request for map-based services has become a common activity in people's daily lives. Many users request the map-based services through a search engine on a computing device or downloaded on a personal navigation device. The requests for map-based services by the users are made prior to driving to an appointment or an event at an unfamiliar location. However, a problem with the conventional map-based services is that the planned routes given are based on finding routes with a shortest geographical-distance, without evaluating other factors that may affect driving conditions.

Other approaches attempt to find routes with a shortest travel time based on speed estimation models. The models estimate the speed of a road according to a road type, such as identifying whether the road is an interstate, a four-lane road, or a two-lane road. The problem is that the models do not take account of other factors that affect speed, such as traffic flows.

As the requests for map-based services continue, there is an increasing opportunity to provide the user with more efficient routes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes providing a route with landmarks to help the user with driving directions. The route is computed based on information collected from route-oriented vehicle logs. In one aspect, the route processes global positioning system (GPS) points from route-oriented vehicles by extracting trajectories from the route-oriented vehicle logs. The trajectories represent individual trips for the route-oriented vehicles. Relying on the trajectories, a landmark graph is constructed with landmarks. A landmark is defined as a road segment that is frequently visited by the route-oriented vehicles.

In another aspect, a route plan receives user input for a starting location and a destination location for driving directions. The route plan accesses the landmark graph based on a sequence of landmarks to compute an initial route. In response to the initial route, the process calculates a path between each pair of consecutive landmarks and refines the initial route by sequentially connecting the landmarks. The route plan presents a route with a nearest landmark to the starting location, landmarks along the route, and another nearest landmark to the destination location.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes recommending a route plan with landmarks based on information collected from route-oriented vehicle logs. In an aspect, the route plan processes global positioning system (GPS) logs from route-oriented vehicles. The route plan extracts trajectories from the route-oriented vehicle logs. The trajectories represent individual trips for the route-oriented vehicles and imply human knowledge from drivers of the route-oriented vehicles. For example, human knowledge may include driving conditions during rush hour, road constructions, direction turns, and the like. The route plan constructs a landmark graph with landmarks, defining a landmark as a road segment frequently visited by the route-oriented vehicles. The landmarks help provide users with a more clear, understandable, and memorable presentation of driving directions. Furthermore, the landmarks provide a way to summarize historical trajectories by using locations frequently visited by the route-oriented vehicles, and reduce searching space to speed up the routing process.

In another aspect, the route plan with landmarks receives user input for a starting location and a destination location for a route. The route plan accesses the landmark graph to compute an initial route by using a sequence of landmarks based on the starting location and the destination location. The route plan calculates an initial path based on a sequence of landmarks with transition times. The process refines the initial route by sequentially connecting the landmarks. The user interface may present the route plan with a nearest landmark to the starting location, various landmarks along the route, and another nearest landmark to the destination location.

While aspects of described techniques can be implemented in any number of different computing systems, environments, and/or configurations, implementations are described in the context of the following exemplary computing environment.

Illustrative Environment

Figure 1:
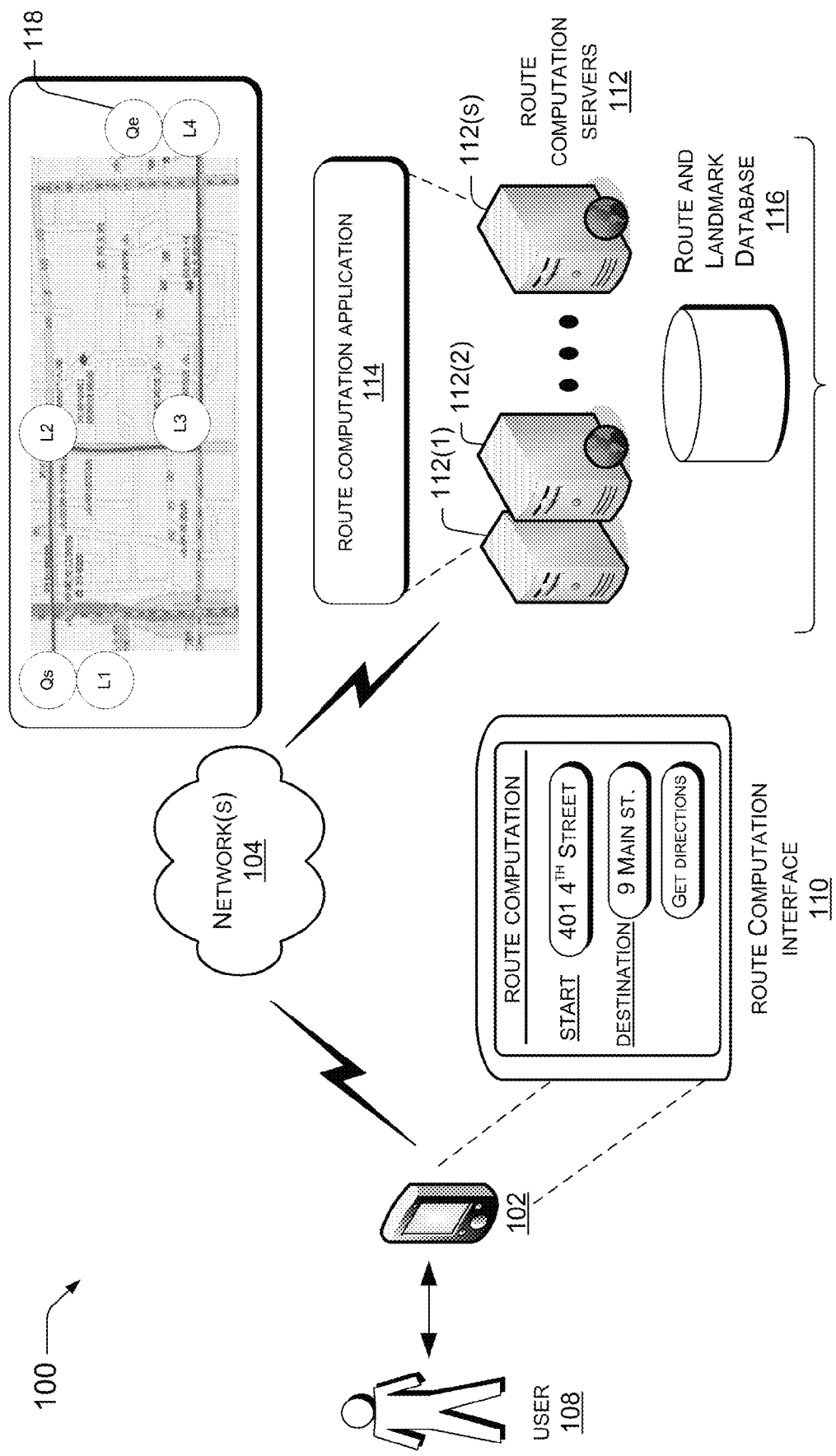
FIG. 1 illustrates an architecture to support an exemplary environment for providing a route plan to a user.

FIG. 1 illustrates an exemplary architectural environment 100, in which a route plan may be recommended on a computing device. The environment 100 includes an exemplary computing device 102, which is illustrated as a personal digital assistant (PDA). The computing device 102 is configured to connect via one or more network(s) 104 to access a route computation service 106 for a user 108. It is noted that the computing device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104 to access the route computation service 106 for the user 108.

The network(s) 104 represents any type of communications network(s), including wire-based networks (e.g., cable), wireless networks (e.g., cellular, satellite), cellular telecommunications network(s), WiFi networks, and IP-based telecommunications network(s). The route computation service 106 represents a map-based application service that may be operated as part of any number of online service providers, such as a search engine. In another implementation, the route computation service 106 may be a map-based application stored in memory of the computing device 102. Updates with GPS logs and trajectories may be sent for a route computation application that is stored on a personal navigation device.

In the illustrated example, the computing device 102 may include a route computation user interface (UI) 110 that is presented on a display of the computing device 102. The user interface 110 facilitates access to the route computation service 106 that provides map-based services. In one implementation, the UI 110 is a browser-based UI that presents a page received from the route computation service 106. The user 108 employs the route computation UI 110 to submit a request for a route from the route computation service 106. The UI 110 may allow for input of several different types of requests. For example, the UI 110 may request and receive input for a start location and a destination location. In another implementation, the request and input may also include a time travel, such as a time of day and a category of day. For example, the user 108 may indicate a travel time at approximately 8 am, which is during rush hour.

In the illustrated example, the route computation service 106 is hosted on one or more route computation servers, such as server 112(1), 112(2), . . . , 112(S), accessible via the network(s) 104. The route computation servers 112(1)-(S) may be configured as plural independent servers, or as a collection of servers that are configured to perform larger scale functions accessible by the network(s) 104. The route computation servers 112 may be administered or hosted by a network service provider that provides the route computation service 106 to and from the computing device 102.

The route computation service 106 further includes a route computation application 114 that executes on one or more of the route computation servers 112(1)-(S). The route computation application 114 may recommend a route plan with landmarks to the user 108, which first includes preprocessing route-oriented vehicle data for a map generation. Data from drivers of route-oriented vehicles are used as they are very familiar with urban road networks and time-variant traffic flows on roads. The drivers know the fastest routes, which are short and quick, but not necessarily the shortest in distance. Thus, the driving data of the route-oriented vehicles enhances the route computation service 106 by mining human knowledge, such as learning smart driving directions. The route computation application 114 may preprocess the route-oriented vehicle data by collecting global positioning system (GPS) logs from various types of route-oriented vehicles. Based on the logs collected, the route computation application 114 identifies geographical locations where the route-oriented vehicles have travelled to generate a map. To better identify effective driving directions in the geographical locations, the route computation application 114 parses trajectories from the logs. The trajectories may be further partitioned, which is described in more detail below. The trajectory data may be stored in a route and landmark database 116 to be used at a later stage to construct a landmark graph.

The trajectory data from the route and landmark database 116 is then used to construct the landmark graph based at least in part on map matching and landmark graph building. The map matching involves associating each route-oriented vehicle trajectory to a corresponding road segment. The landmark graph building also involves specifying a road segment frequently visited by the route-oriented vehicles as a landmark, a frequency being based on a number of route-oriented vehicle logs for the landmark. The landmark graph building specifies landmarks as vertices, generates edges that connect two landmarks, and estimates time cost of the edges. Advantages of using landmarks in the route are to highlight key directions to the destination and making it easier for users to follow routes when given landmarks along the route. In this implementation, the landmark graph is stored in the landmark and route database 116 and is updated on a predetermined time interval. The implementation of constructing the landmark graph is described in more detail below.

After the landmark graph has been constructed, the route computation service 106 is ready to accept user queries. For example, the user 108 accesses the route computation service 106 via the network 104 using their computing device 102. The route computation service 106 in operation with the route computation application 114 presents the user interface 110 to receive a user query, for a starting point and a destination point for driving directions. In the example illustrated in FIG. 1, the user may input a starting point of "401 $4^{th}$ Street" and a destination of "9 Main Street". Once entered, the user submits the query by actuating the button "Get Directions" on the UI 110. Based on the user query, the route computation application 114 searches the landmark graph for an initial route that is represented by a sequence of landmarks. Next, the route computation application 114 connects a set of road segments between each pair of consecutive landmarks. The initial route is refined by calculating fastest paths from a starting point to each terminal point of the landmarks. Then a fastest path is computed, beginning from the landmarks that are near the starting point to ending at the landmarks near the destination point. The user interface 110 displays the route with landmarks 118, that is recommended based on the starting point and the destination point.

As mentioned, the environment 100 may include the route and landmark database 116, which may be a separate server or may be a representative set of servers 112 that is accessible via the network(s) 104. The route and landmark database 116 may store information, such as logs for the route-oriented vehicles which include a sequence of global positioning system (GPS) points, trajectories archive, a landmark graph, the initial route from the landmark graph, the fastest path from starting point to each terminal point of the landmarks, and the like.

The environment 100 shows a representation of the route computed 118, which is a recommendation by the route computation service 106 to the user 108. Shown is a heavy darken line, which is the route suggested with landmarks. While the route may not appear to be the shortest path from the start point Qs, it is the fastest path by learning smart driving patterns. Shown are Qs for query starting location at "401 $4^{th}$ Street", L1 represents a landmark nearest to the starting location, L2 represents another landmark on where to turn south, such as "Northeast 4$^{th}$ Street", and L3 represents yet another landmark to turn east. At the end of the path is Qe, which is the query ending location at "9 Main Street", represented with the nearest landmark L4.

Figure 2:
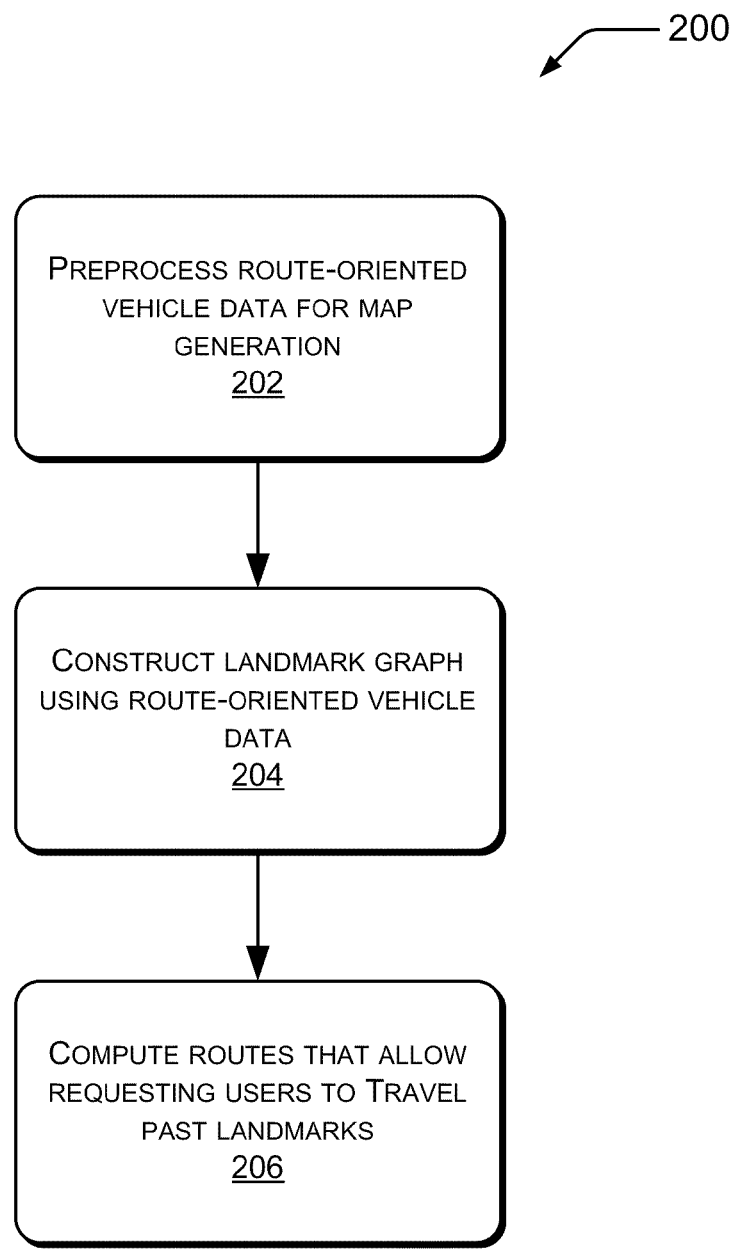
FIG. 2 is a flowchart showing exemplary phases for providing a route plan: preprocessing data, constructing a landmark graph, and computing a route to be used in the architecture of FIG. 1.

FIG. 2 is a flowchart showing an exemplary process 200 among high level functions performed by the route computation service 106. The route computation service 106 computes a route based on log information collected from the route-oriented vehicles. The process 200 is divided into three phases, an initial phase to preprocess route-oriented vehicle data for map generation 202, a second phase to construct a landmark graph using route-oriented vehicle data 204, and a third phase to compute routes that allow requesting users to travel past landmarks 206. The phases are to be used in the environment of FIG. 1. Details are discussed for preprocessing the route-oriented vehicle data for map generation 202 in FIG. 3; for constructing the landmark graph using the route-oriented vehicle data 204 in FIGS. 4, 5a, and 5b, and for computing the routes that allow requesting users to travel past landmarks 206 in FIGS. 6-8.

Preprocessing the route-oriented vehicle data for map generation 202 involves the route computation application 114 collecting GPS logs from various types of route-oriented vehicles. The logs may be obtained from GPS sensors located on each of the route-oriented vehicles. A GPS log is generally a collection of GPS points, which includes a date, a time, a longitude, and a latitude. In an implementation, the route computation service 106 may obtain GPS logs from a taxi company. Each taxi may be equipped with the GPS sensor that records GPS log data every two to eight minutes per point. Taxi drivers typically drive the fastest way based on their knowledge of the roads and traffic flows at various times, in order to make more profit. Thus, the route computation application 114 learns smart driving directions based on the taxi driver's knowledge. Next, the route-oriented trajectories are partitioned from the route-oriented logs, in order for the trajectories to provide a better representation of individual trips. Furthermore, the computation service application 114 determines when a time interval between two consecutive GPS points is greater than a predetermined threshold; to partition the two consecutive GPS points into two different trajectories. For example, this may occur when the taxi driver is quitting for the day by closing down their taxi for the night. On the other hand, if the time interval between the two consecutive GPS points is less than the predetermined threshold, to combine the two consecutive GPS points into a trajectory.

In another instance, the route-oriented vehicle trajectories may be divided into separate trajectories when a stay point is identified. The stay point represents a geographical region that the route-oriented vehicle remained stationary for a time period, the stay point based at least in part on a time threshold within a distance threshold. For example, if the taxi remained stationary for more than 20 minutes within a distance of 30 meters, the stay point is identified and used for separating the trajectory into two portions. The two parameters indicate the taxi may be waiting for passengers, rather than an individual trip. Once the GPS log data has been transformed into trajectory data, the information is stored in the route and landmark database 116 to be used in constructing the landmark graph. The information stored may be updated on predetermined time intervals.

The second phase, to construct the landmark graph 204 means the GPS log data has been transformed into trajectory data to be useful for building a graph with landmarks. Landmarks serve as guides that follow a natural thinking pattern of humans for easy driving directions. The trajectory data is retrieved from the route and landmark database 116. There may be 10-meter or more positioning error with the GPS sensor readings, which may cause the reported geographical locations of the route-oriented vehicles to not map correctly to the road segments. To address this problem, a map matching algorithm evaluates the spatial geometric and topological structures of the road network and the temporal/spatial speed constraints of the roads traversed by the route-oriented vehicles. The algorithm associates the trajectory to road segments based on identifying candidates for road segments, determining observation and transmission probabilities as likelihood of matching candidates and defining a true path, measuring a distance between actual average speed between candidates and speed constraints of the path, and identifying a best matching path.

Another aspect of constructing the landmark graph involves building the landmark graph by first specifying landmarks. This occurs by using a landmark construction algorithm to identify landmarks, represent landmarks as vertices, generate edges between two vertices, and estimate a time cost of the edges. In an implementation, the algorithm identifies a top k road segments that is frequently visited by taxis. Each trajectory is represented by a sequence of road segments with transition times and each landmark is represented as a vertex. The landmark graph may be stored in the route and landmark database 116 and utilized whenever the route computation service 106 is activated or when the information is updated.

The third phase, to compute the routes that allow requesting users to travel past landmarks 206, starts when the user 108 wants driving directions to a new location. For example, the user 108 initiates the route computation service 106 via the network 104. Upon activating the route computation service 106, the user interface 110 is presented to the user 108 requesting a starting location and a destination location. The user 108 may be starting from home, providing this as input for the starting location and providing the new location address as the destination location. Typically, the destination location may be for a first time visit or for a place not visited often, such as a dentist, accountant, and the like.

In another implementation, in addition to the starting and destination locations, there may be a request specified for a time period of travel. This may be desirable during rush hour traffic. For the time period request, the trajectories have been partitioned into multiple parts according to a time of a day and category of day, weekday or weekend. Also, there are multiple landmark graphs for different time spans.

In addition, the computing routes that allow requesting user to travel past landmarks 206 include an initial algorithm to search the landmark graph given the starting location and the destination location. The algorithm computes an initial route based on the sequence of landmarks with corresponding transition time between landmarks and landmarks nearest the starting and destination locations. Furthermore, Dijkstra algorithm is used to find a fastest path for pairs of start and end points nearest potential landmarks. The route computation application 114 takes the initial route as input to find a detailed path sequentially connecting the landmarks in the initial route. The route computation application 114 continues computing fastest paths between landmarks by using a refined algorithm. Once the route with landmarks 118 is identified, it is presented to the user 110. The route may not be the shortest but is the fastest based on the collection of GPS logs. Shown is L2 in 118, which helps guide the user 108 to turn south there.

Exemplary Processes

Figure 3:
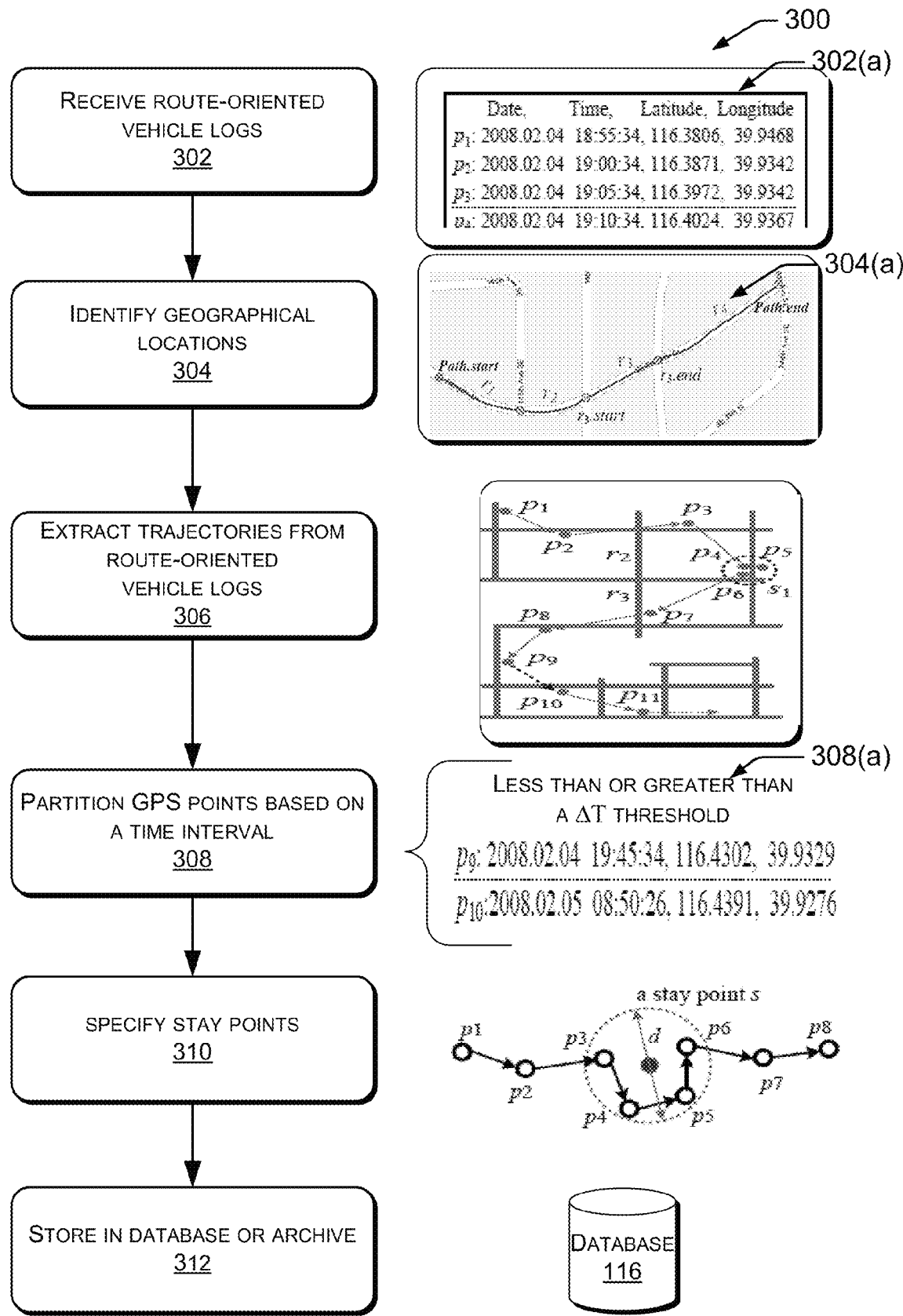
FIG. 3 is a flowchart showing an exemplary process for preprocessing the data.
Figure 4:
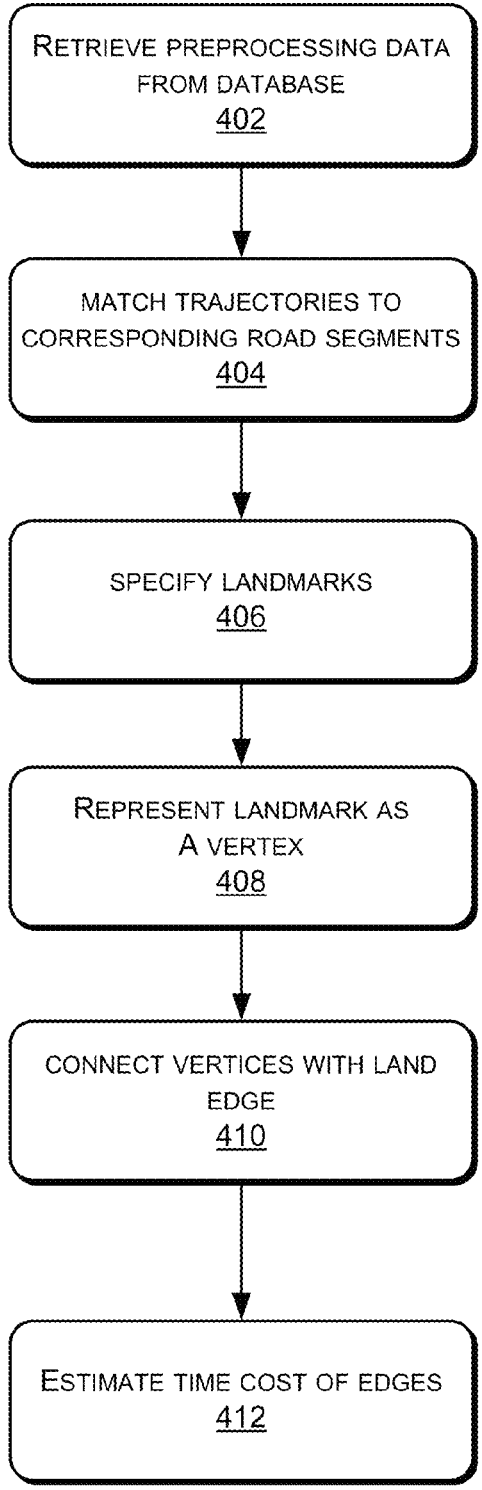
FIG. 4 is a flowchart showing an exemplary process for constructing the landmark graph.
Figure 4:
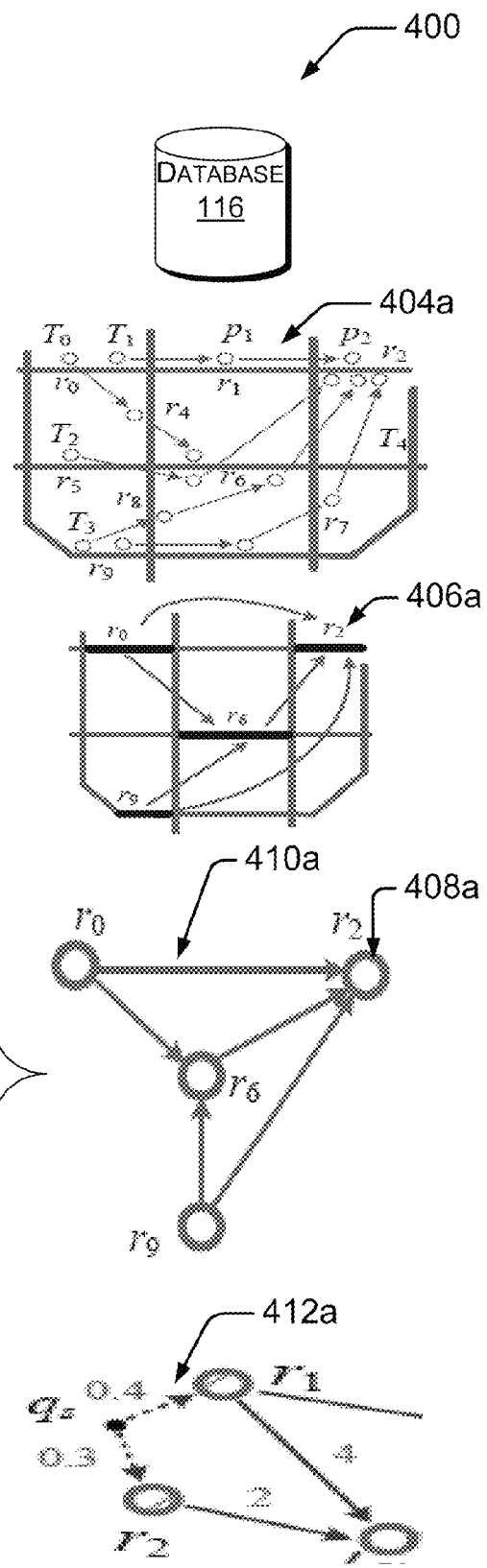
Figure 6:
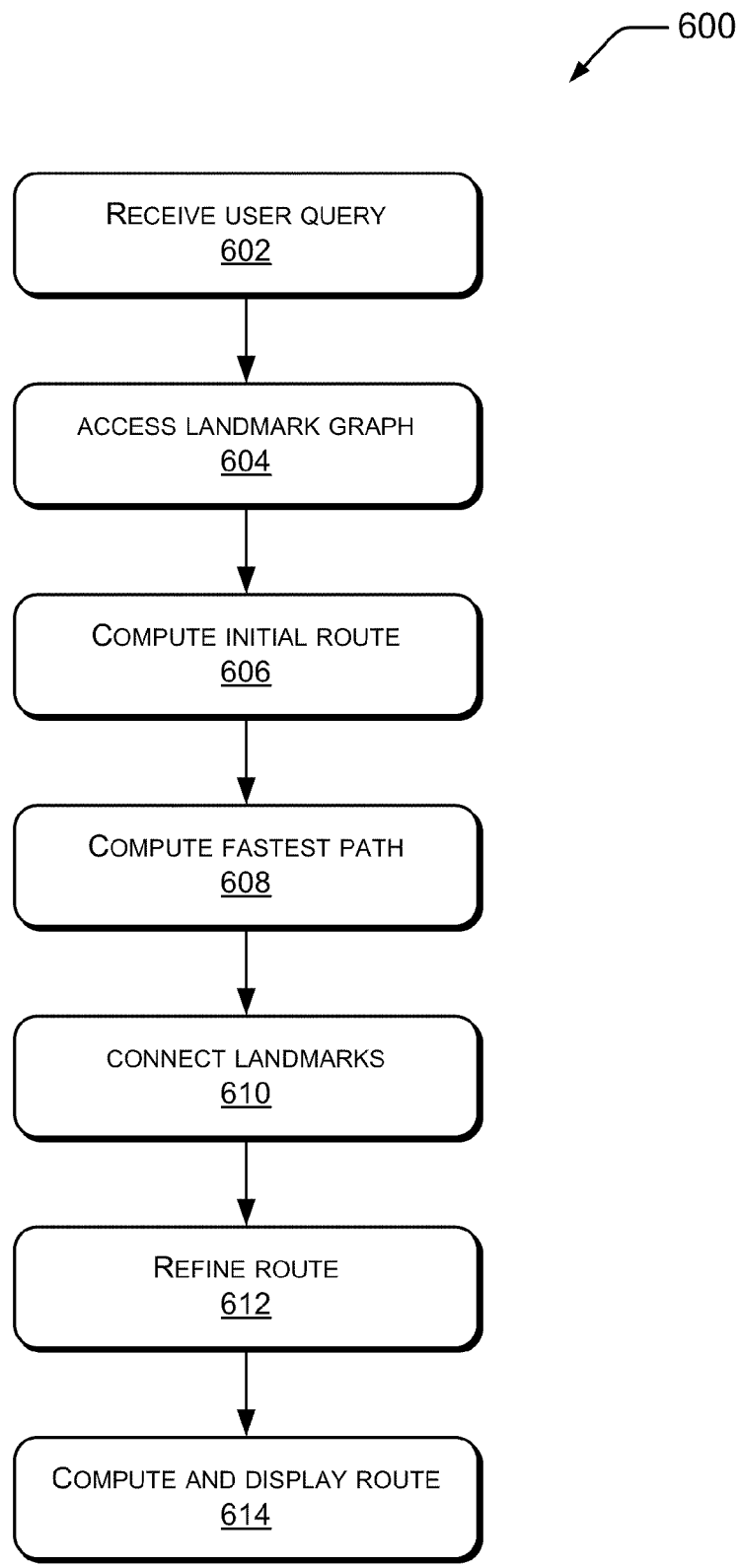
FIG. 6 is a flowchart showing an exemplary process of computing a path.

FIGS. 3, 4 and 6 are flowcharts showing exemplary processes for preprocessing route-oriented vehicle data for map generation, constructing the landmark graph using route-oriented vehicle data, and computing routes that allow requesting users to travel past landmarks, respectively. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

FIG. 3 is a flowchart illustrating an exemplary process 300 of preprocessing route-oriented vehicle data for map generation 202 for the route computation service 106. The process 300 may collect or receive GPS logs from the route-oriented vehicles 302. For example, the route-oriented vehicles may include taxis, limousines, package delivery trucks for UPS or Federal Express, and the like. Drivers for the route-oriented vehicles may be very familiar with urban road networks and time-variant traffic flows on roads. To be effective and to make profit, the drivers for the route-oriented vehicles tend to select a fastest way based on their knowledge. Along with their knowledge, the drivers consider other factors, such as traffic flows and signals, accidents, road constructions, direction turns, and the like. By directly following their routes that are well supported by the GPS logs, the knowledge of the drivers may be effectively used.

It is possible to collect log information since a large number of the route-oriented vehicles may be equipped with a global positioning system (GPS) sensor that automatically records a sequence of GPS points. The GPS points contain a date, a time, a longitude, and a latitude, which may be collected with a low sampling rate every two-eight minutes per point. As shown at 302($a$), three GPS points p1, p2, and p3 from the route-oriented vehicle have been collected with dates, times, latitudes, and longitudes for the points.

The process 300 identifies geographical locations from the route-oriented vehicle logs 304. The geographical locations represent locations where the route-oriented vehicles have travelled as recorded in the logs. The process 300 may further divide the geographical locations into road segments. A road segment is a directed edge that is associated with a direction symbol, two terminal points, and a list of intermediate points describing the road segment with a polyline. Shown in FIG. 3 is the polyline representing the road segments 304($a$). The polyline is a collection of road segments r1, r2, r3, and r4.

The process 300 extracts the route-oriented vehicle trajectories from the route-oriented vehicle logs 306 to better represent the data as trips. The extractions of the route-oriented vehicle trajectories are to identify individual trips. As shown in 302($a$), points p1, p2, p3, and p4 are identified as one trajectory, which represents a single trip.

The GPS points in the logs may be partitioned to identify more accurate driving directions. In one instance, the partitioning is based on a time interval 308. By evaluating the GPS points to determine when the time interval between two consecutive GPS points is greater than a predetermined threshold, the process 300 may partition the two consecutive GPS points into two different trajectories. In an implementation, the predetermined threshold may be 30 minutes. If the time interval for the two consecutive GPS points is greater than 30 minutes, it is presumed the drivers for the route-oriented vehicle may have stopped working for the day. On the other hand, when the time interval between the consecutive GPS points is less than the predetermined threshold, the consecutive GPS points are combined as a single trajectory. Shown at 308($a$), the log may be divided into two parts. Based on the log information, division at p9 because the time interval between p9 and p10 is over the predetermined $\Delta T$ threshold (if $\Delta T$=30 minutes).

In addition to partitioning, the process 300 may also detect or specify stay points 310 to identify more accurate driving directions. The stay point is based at least in part on a time threshold within a distance threshold, as shown to the right of 310. The stay point represents a geographical region that the route-oriented vehicle has remained stationary for a time period. When the stay point has been detected or identified, the process 300 segments the route-oriented vehicle trajectory by this stay point.

The stay point may be specified or detected when drivers for taxis or limousines are waiting for their passengers at some locations, while remaining in their vehicles. Alternatively, some drivers may be running in and out of their vehicles to deliver packages, causing a potential stay point to appear. By having the time threshold within the distance threshold avoids identifying traffic jams. For example, the drivers of the route-oriented vehicles may be stuck in traffic jams. In an implementation, the time threshold may be 20 minutes within a distance threshold of 30 meters. Assuming the place visited may be for less than 15 minutes and a distance of 120 meters. Thus, this place is not over the time threshold and not within the distance threshold, so there is no division of the trajectory.

After the GPS points for the route-oriented vehicle logs have been collected and the trajectories identified for the GPS points pertaining to a single trip, the process 300 may store the trajectory information in the route and landmark database 116 or archive the information 312. Alternatively, the information may be stored as part of a database attached to the server 112. In another implementation, the information may be downloaded and stored in the personal navigation device.

FIG. 4 is a flowchart showing an exemplary process 400 of constructing the landmark graph using route-oriented vehicle data 204 for the route computation service 106. The route-oriented vehicle logs were preprocessed into trajectories to be used in constructing the landmark graph. The trajectories shown in FIG. 3 may be retrieved from the route and landmark database 116 or from a database attached to the server 402.

The landmark graph is constructed 204 by accessing the trajectories stored in the route and landmark database 116. The landmark graph construction includes associating or matching each route-oriented vehicle trajectory to a corresponding road segment 404. Shown in 404$a$, are five trajectories, $T_0, \ldots T_4$. The five trajectories are associated or matched to corresponding road segments, e.g., two points p1 and p2 from $T_1$ have been mapped to r1 and r2, respectively. Thus, each trajectory may be represented by a sequence of road segments with transition times.

Problems may exist when collecting the GPS points for the logs. In one instance, readings from a GPS sensor may have a positioning error, causing locations of the route-oriented vehicle aligned to incorrect road segments. Another problem is that the route-oriented vehicles report their location-time information in a low sampling rate of about every five minutes. To address these problems, a global map-matching algorithm is proposed. The map-matching algorithm evaluates spatial geometric and topological structures of a road network and temporal/speed constraints of the roads traversed by the route-oriented vehicles. Details of the map-matching algorithm follow in FIGS. 5a and 5b.

The construction of the landmark graph 204 also includes specifying or identifying road segments frequently visited by the route-oriented vehicles as landmarks 406. A frequency being based on a number of route-oriented vehicle logs recorded for the landmark. In an example shown in 406a, a top k number of road segments are identified as the landmarks. In 406a, when k=4, the four road segments may be identified as: r0, r2, r6, and r9.

Once the landmark is identified, it may be represented as a vertex 408. The vertex is shown at 408(a). A landmark edge may be used to connect two vertices 410, as long as a trajectory is directly passing the two vertices. Shown in 410a, the edge connects r0 to r2. The edge may be represented by δ=1 and denotes frequently travelled path between two landmarks. The landmark edges are computed and connected to any of the two vertices.

A time cost of the landmark edge is estimated 412. The time cost estimate of each edge is based on calculating a median of travel time over the trajectories passing the two vertices that are connected by the landmark edge. For example, the median of travel time cost is 0.3 from qs (query start point), to r2 and 0.4 from qs to r1, as shown in 412a.

An algorithm proposed for the landmark graph construction is shown below. L is a collection of landmarks. As mentioned, the top k is used rather than a threshold to determine landmarks, as the threshold may vary in the scale of the trajectory set. With a fixed threshold, more road segments will be detected as landmarks given more trajectories. However, a threshold δ may be used to detect the landmark edge because the path may exist as long as the path has been traversed by some route-oriented vehicles. The algorithm follows:

---
Algorithm for Landmark Graph Construction ($G_r$, A, k, δ)
---
Input: A road network $G_r$, a trajectory archive A, the number of landmarks k and a threshold δ determining the edge support.
Output: A landmark graph $G_l$.
1. M= Ø, Count[ ]=0, E=Ø;
2. Foreach trajectory T∈A;
3.    S=MapMatching(T, $G_r$); //Project a trajectory to road segments
      //S is a road segment sequence with transition times
4.    M.Insert(S); //Add S to the sequence collection
5.    Foreach road segment r∈S
6.       Count[r]++; //The individual counter for each road segment
7. L = Top_k (Count[ ], k); //Select the top k road segments as landmarks;
8. Foreach S∈M
9.    S = Convert(S, L); //Convert each S to a landmark sequence
10.    For i=0; i<|S|; i++;
11.       l=[i], l'=S[i +1]; // two consecutive landmarks from S
12.       If $e_{l,l'}$∉E //There is no edge between the two landmarks
13.          $e_{l,l'}$=BuildEdge(l, l');
14.          E. Insert ($e_{l,l'}$); //Add the edge to the collection
15.       el,'.sup++; // Count the number of trajectories passing it
16.       el,'.Δt.Add (Δt(l,l')); // Save the transition time
17. Foreach edge e∈E
18.    If e.sup< δ
19.       E.Remove(e);
20.    Else
21.       e.cost=Median (e.Δ[ ]); //Select the median value.
22. Return $G_l$=(L,E);
---

Figure 5A:
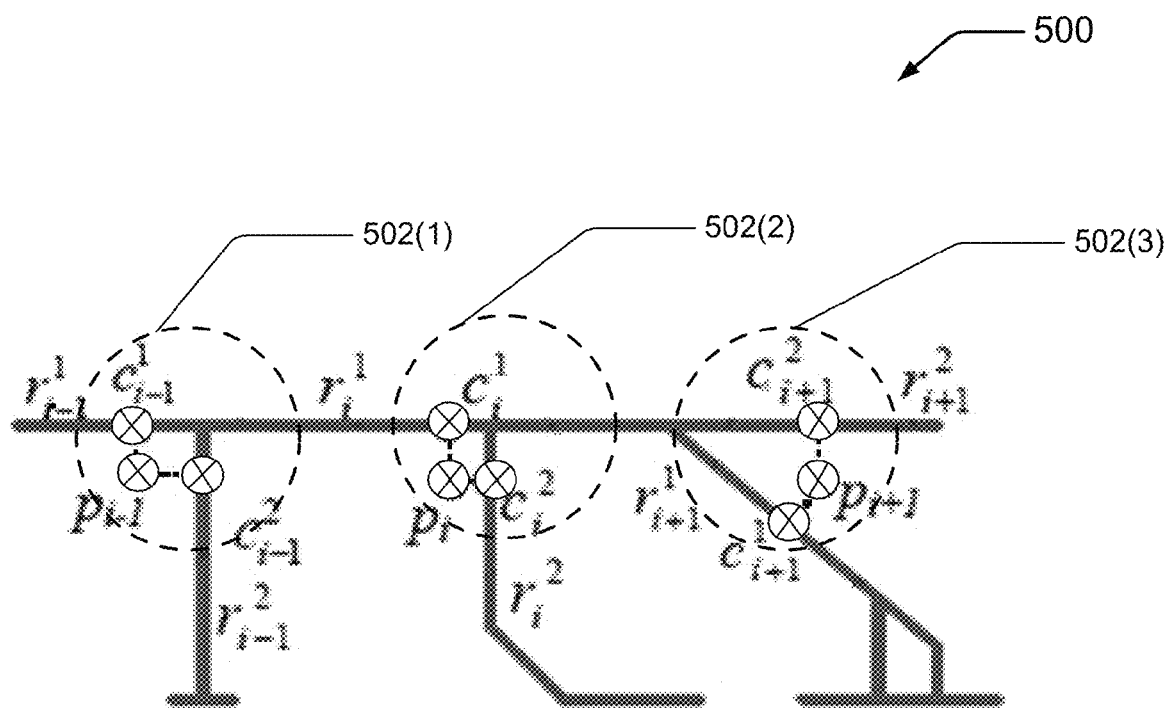
FIG. 5a illustrates an exemplary process of selecting candidate road segments.
Figure 5B:
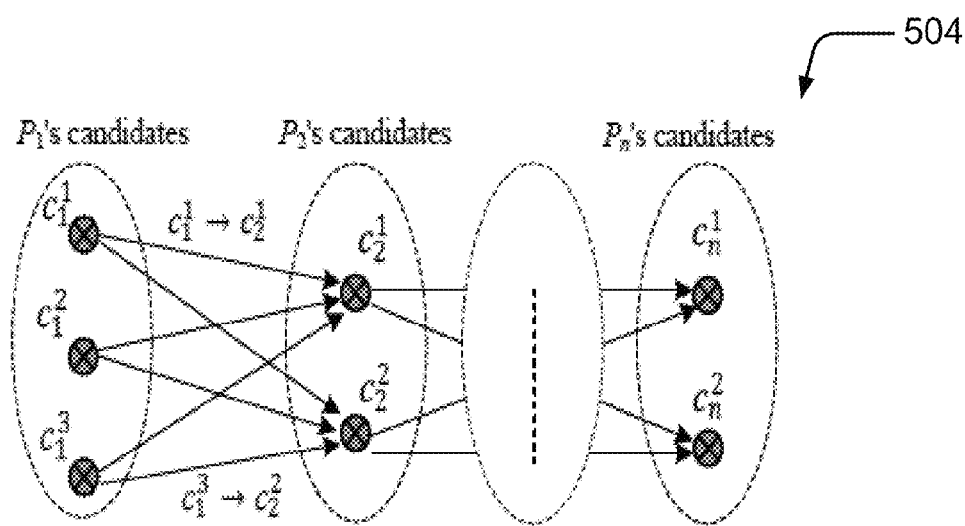
FIG. 5b illustrates an exemplary process of generating a candidate graph.

FIGS. 5a and 5b describe details of the map-matching algorithm that associates or matches each route-oriented vehicle trajectory to a corresponding road segment. FIG. 5a is a schematic showing an exemplary process 500 of selecting candidate road segments.

For each GPS point $p_i$, a circle 502(1), 502(2), 502(3), . . . , 502(N) encompassing a set of road segments within a radius d is shown. For example, two candidate road segments and $r_{i-1}^1$ and $r_{i-1}^2$, fall in the radius d of $p_{i-1}$, meaning the route-oriented vehicles may travel on $r_{i-1}^1$ or $r_{i-1}^2$. Utilizing this data, the map-matching algorithm identifies one or more candidate sets of one or more candidate projection points, $c_{i-1}^1$ and $c_{i-1}^2$, of $p_{i-1}$. Furthermore, $p_i$'s candidate projection points $c_i^1$ and $c_i^2$ may be detected along candidate edges $r_i^1$ and $r_i^2$, respectively.

Spatial analysis is a product of observation probability and transmission probability. Observation probability is typically defined as the likelihood that the GPS point $P_i$ matches a candidate point $c_i^j$. computed based on a distance between two candidate points dist($c_i^j$, $p_i$). Generally, the error in a GPS measurement is reasonably described as a normal distribution N(μ, σ²) of the distance between $P_i$ and $c_i^j$. The observation probability may defined as:

$$N(c_i^j) = \frac{1}{\sqrt{2\pi}\,\sigma} = e^{\frac{(x_i^j-\mu)^2}{2\sigma^2}}$$

where x is the distance between the GPS observation $P_i$ and its corresponding candidate point $c_i^j$, represented as $x_i^j$=dist ($c_i^j$, $p_i$).

For example, given two candidate points $c_{i-1}^t$ to $c_i^s$ for two neighboring GPS sampling points $p_{i-1}$ and $p_i$ respectively, the transmission probability from $c_{i-1}^t$ to $c_i^s$ is defined as the likelihood that the "true" path from $p_{i-1}$ and $p_i$ follows the shortest path from $c_{i-1}^t$ to $c_i^s$. Such a true path may be represented by:

$$V(c_{i-1}^t \rightarrow c_i^s) = \frac{dist(p_i, p_{i-1})}{w_{(i-1,t)\rightarrow(i,s)}}$$

where $d_{i-1,i}$=dist($p_i$, $p_{i-1}$) is the Euclidean distance between $p_i$ and $p_{i-1}$, and $w_{(i-1,t)\,(I,s)}$ is the length of the shortest path from to $c_{i-1}^t$ to $c_i^s$.

As mentioned, the spatial analysis is the product of the observation probability and the transmission probability. Combining the observation probability and the transmission probability, the spatial analysis function $F_s(c_{i-1}^t$ to $c_i^s)$ may be defined by:

$$F_s(c_{i-1}^t \rightarrow c_i^s)=N(c_i^s)\ast V(c_{i-1}^t \rightarrow c_i^s),$$

where $c_{i-1}^t$ and $c_i^s$ may be any two candidate points for two neighboring GPS points $p_{i-1}$ and $p_i$.

Temporal analysis may be determined for two projected candidate points $c_{i-1}^t$ and $c_i^s$ for two neighboring sampling points $p_{i-1}$ and $p_i$, respectively, the shortest path, as determined above, from $c_{i-1}^t$ and $c_i^s$ is denoted as a list of road segments [$r_1'$, $r_2'$, . . . , $r_k'$]. The average speed $\bar{v}_{(i-1,t)\rightarrow(i,s)}$ of the shortest path is computed using the following formula:

$$\bar{v}_{(i-1,t)\rightarrow(i,s)} = \frac{\sum_{u=1}^{k} r_u' \cdot l}{\Delta t_{i-1\rightarrow i}}$$

where $r_u'$,l is the length of $r_u'$, and $\Delta t_{i-1 \rightarrow i}=p_i.t-p_{i-1}.t$ is the time interval between two points $p_i$ and $p_{i-1}$. Note that each road segment $r_u'$ is also associated with a typical speed value $r_u'$,v. A cosine similarity may be used to measure the distance between the actual average speed from $c_{i-1}{}^t$ to $c_i{}^s$ and the speed constraints of the path, i.e., a vector containing k elements of the same value $\bar{v}_{(i-1,t) \to (i,s)}$ and a vector (r1'.v, r2'.v, ..., rk' .v)T. The temporal analysis function may be defined as:

$$F_t(c_{i-1}^t \to c_i^s) = \frac{\sum_{u=1}^{k}(r_u' \cdot v \times \bar{v}_{(i-1,t) \to (i,s)})}{\sqrt{\sum_{u=1}^{k}(r_u' \cdot v)^2} \times \sqrt{\sum_{u=1}^{k} \bar{v}_{(i-1,t) \to (i,s)}^2}}$$

As in the spatial analysis functions described above, $c_{i-1}{}^t$ and $c_i{}^s$ are for two neighboring sampling points $p_{i-1}$ and $p_i$, respectively.

FIG. 5b is a schematic showing an exemplary process 504 of generating a candidate graph $G'_T(V'_T, E'_T)$ for trajectory T. Following the spatial analysis and the temporal analysis calculations, the candidate graph is generated. As depicted in FIG. 5b, $V'_T$ is a set of candidate projection points and $E'_T$ is a set of edges representing the shortest paths between two neighboring candidate points. Each node in $G'_T$ is associated with $N(c_i{}^s)$ and each edge is associated with $F_t(c_{i-1}{}^t \to c_i{}^s)$ and $F_s(c_{i-1}{}^t \to c_i{}^s)$. Combining the equations, the spatial-temporal (ST) function may be defined as:

$$F(c_{i-1}{}^t \to c_i{}^s) = F_s(c_{i-1}{}^t \to c_i{}^s) * F_t(c_{i-1}{}^t \to c_i{}^s), 2 \leq i \leq n.$$

From all of the candidate sequences, the route computation service 106 finds the best matching path P (with the highest overall score) for the trajectory T using a dynamic strategy. The equation for finding the best math is:

$$P = \arg \max_{P_c} F(P_c), \forall P_c \in G'_T(V'_T, E'_T).$$

The map-matching algorithm is shown below. The framework may begin by computing a set of candidate points for each GPS sampling point on Trajectory T. The candidate graph may then be constructed based upon the spatial and temporal analyses, followed by a report identifying the path sequence P with the highest ST-function value from $G'_T$ as the result.

| Map-Matching Algorithm |
| --- |
| Input: Road Network G, a trajectory T:p1→p2→...→pn. |
| Output: The matched sequence P: c1j1→c2j2→...→cnjn in G |
| 1:    Initialize tList as an empty list; // a list of sets of candidates |
| 2:    for i = 1 to n do |
| 3:        s = GetCandidates(pi, G, r); // candidates within radius r |
| 4:    tList.add(s); |
| 5:    GT' = ConstructGraph(tList); // constructs graph GT' |
| 6:    RETURN FindMatchedSequence (GT') |

FIG. 6 is a flowchart showing an exemplary process 600 of computing the path 206 for the route computation service 106. The route computation service 106 presents the user interface 110 on the display of the computing device 102, after the user 108 activated the route computation service 106. The user interface 110 gives the user 108 access to the map-based services provided by the route computation service 106.

The route computation service 106 requests and receives input or query 602 from the user 108 on the user interface 110. In an implementation, the user input may be for a request for a starting location and a destination location. It is commonly understood that the time of day for travelling on the route may affect the amount of time provided for the driving directions. Traffic patterns are considerably different during rush hour on weekdays as compared to weekends.

In another implementation, the user-specified query may be for the starting location, the destination location, and a time of day and a category of day for travelling from the starting location to the destination location. The time of day may be given in hours, am or pm, and the category of day is a weekend or a weekend. The route computation service 106 recommends a fastest path to the user 108 in terms of the query time. Thus, the route computation service 106 may partition the trajectories into multiple parts, according to the time of a day (7 am to 9 am, 5 pm to 7 pm) and category of days (weekdays or weekends). The route computation service 106 builds multiple landmark graphs corresponding to different time spans. This implementation is based on the user 108 specifying time spans for travelling on the route.

In yet another implementation, the route computation service 106 estimates a time span for the user 108. This occurs when the user 108 issues a query on $t_s$, a distance between the starting location and the destination location given by the user 108 may be dist(qs,qe). The possible driving time span may be shown as [ts,ts+(dist(qs,qe)V]. V is an imagined speed constraint, such as 40 KM/hr. The route computation service 106 selects the landmark graph according to time, covering most parts of the query time span. Then the route computation service 106 computes the path or the route based on the landmark graph according to a time frame.

Once the route computation service 106 receives the input or query from the user 108, the route computation service 106 accesses the landmark graph 604 constructed from the route-oriented vehicle trajectories. The construction of the landmark was previously described in FIGS. 4 and 5. The route computation service 106 searches the landmark graph for an initial route based on the user input for starting and destination locations. The route computation service 106 locates the sequence of landmarks with corresponding transition times between the landmarks and a least amount of travel time. This is shown below as:

$$R = l_0 \xrightarrow{\Delta t_0} l_1 \xrightarrow{\Delta t_1} \ldots \xrightarrow{\Delta t_{n-1}} l_n, l_i \in L.$$

Figure 7:
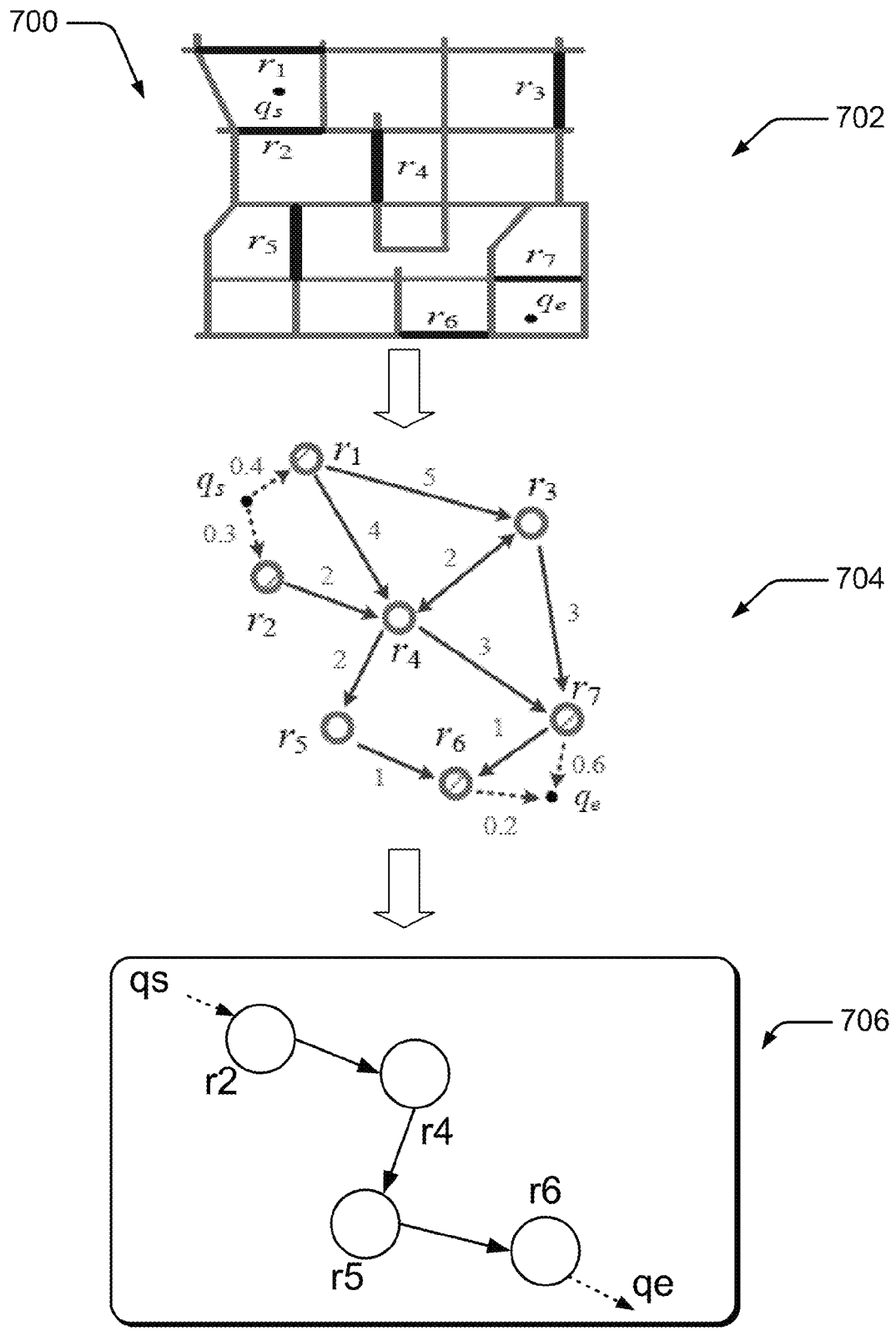
FIG. 7 illustrates an exemplary process of a road network, a corresponding landmark graph, and an initial route.

In addition, the route computation service 106 locates m landmarks over the landmark graph. The m landmarks are landmarks that are nearest to the starting location and destination location. An illustration of the nearest landmarks to the starting and destination locations is shown in FIG. 7. For example, there may be a variable number of landmarks close to the starting location, such as if m=2, the two landmarks nearest the starting location may be r1 and r2 and the two landmarks nearest the ending location may be r6 and r7.

For each pair of start and end points, the route computation service 106 computes a fastest path or route 608 by using a shortest path algorithm. An example of a shortest path algorithm that may be used is:

| Dijkstra's Algorithm |
| --- |
| 1.   INITIALIZE SINGLE-SOURCE (G, s) |
| 2.   S {} // S will ultimately contains vertices of final shortest-path weights from s |
| 3.   Initialize priority queue Q i.e., Q V[G] |
| 4.   while priority queue Q is not empty do |
| 5.       u ← EXTRACT_MIN(Q) // Pull out new vertex |

| Dijkstra's Algorithm |
| --- |
| 6.                     S← S ∪ {u}<br>                        // Perform relaxation for each vertex v adjacent to u<br>7.                     for each vertex v in Adj[u] do<br>8.                           Relax (u,v,w) |

The initial route is efficient since the landmark graph is a small subset of the original road network. As mentioned, the process selects the route with the least time cost. The time costs for travelling from the starting location to the destination location to their nearest landmarks are estimated in terms of speed constraints of the road networks. The starting and destination locations tend to be relatively close to their nearest landmarks. However, the estimated time cost may have a small inaccuracy that may not reduce the effectiveness of the initial routing. The algorithm used for the initial routing is shown below:

| Algorithm for Initial Routing ($G_l$, $q_s$, $q_e$, m) |
| --- |
| Input: A landmark graph $G_l$, the start point $q_s$ and destination point $q_e$ of a user-specified query, m-nearest landmarks of start and destination.<br>Output: A quick path R on landmark graph.<br>1.     R=∅;<br>2.     $L_s$← NearestLankmark($q_s$,$G_l$, m); //search m nearest landmarks for $q_s$<br>3.     $L_e$← NearestLankmark($q_e$, $G_l$, m); //search m nearest landmarks for $q_e$<br>4.     For i=0; i<m; i ++;<br>5.        For j=0; j<m; j ++;<br>6.           R ← ShortestPath ($G_l$,i ,$L_e$j ); //compute the fastest path<br>7.           R.Add (R);<br>8.     R = SelectRoute (R$_s$,$q_e$); //Select the lowest time-cost route;<br>9.     Return R; |

After the initial route has been computed 606, the process 600 applies this as input, and finds a detailed path that sequentially connects the landmarks 610 in the initial route. There may be some landmarks that are bidirectional road segments, the direction should be determined in which the route-oriented vehicles may traverse this segment. Thus, the process 600 may compute additional fastest paths for the unidirectional and bidirectional road segments.

A refined routing 612 may take advantage of the initial route. The sequence between the landmarks has already been specified by the initial route, making it possible to compute a fastest path 608 between each pair of consecutive landmarks, respectively and independently. Furthermore, the distance between two consecutive landmarks is much smaller than that between the start and destination locations, reducing the search area significantly.

After computing the fastest paths 608 between the landmarks, the process 600 performs the refined routing 612. The process 600 finds the fastest path from a starting point to each terminal point of the landmarks by employing a dynamic programming strategy. This process is performed step by step until the destination is reached. The algorithm for refining the route is shown below:

| Algorithm for Refined Routing (Gr, qs, qe, R) |
| --- |
| Input: A road network Gr, the start point qs and destination point qe of a user-specified query, an initial routing result R (a landmark sequence).<br>Output: A refined fast route Path.<br>1.     Pat(r0.end)←ShortestPath(Gr,qs,r0.start) ∪(r0.start →end);<br>2.     If r0.dir != one-way<br>3.         Path(r0.start)←ShortestPath(Gr,qs,r0.end) ∪(r0.end→start); |

| Algorithm for Refined Routing (Gr, qs, qe, R) |
| --- |
| 4.     For each road segment ri∈R,1≤i<R ,<br>5.     Set the time cost of R1,R2,R3,R4 to ∞; //intermediate candidates<br>6.     R1←Pat(ri-1.end)∪ ShortestPath(Gr,ri-1.end,ri.start);<br>7.     If ri-1 .di!= one-way<br>8.         R2←Pat(ri-1.start)∪ ShortestPath(Gr ,ri-1.start,ri.start);<br>9.     If Timecost R1 <Timecost R2<br>10.    Path(ri.end)= R1∪(ri.start →end);<br>11.    Else<br>12.        Path(ri.end)= R2∪(ri.start →end);<br>13.    If ri.di!= one-way<br>14.        R3←Path(ri-1.end)∪ ShortestPath(Gr,ri-1.end,ri.end);<br>15.    If ri-l.di!= one-way && ri.dir != one-way<br>16.        R4←Path(ri-1.start)∪ShortestPath(Gr,r-i.start,ri.end);<br>17.    If Timecost R3 <Timecost R4<br>18.        Path(ri.start)=R3∪(ri.end →start);<br>19.    Else<br>20.        Path(ri.start)= R4∪(ri.end →start);<br>21.    End For each<br>22.    R1 =Path rn.end ∪ ShortestPath(Gr,rn.end,qe) ; //n= ∣ R ∣ -1;<br>23.    If rn.dir = one-way<br>24.    Path ←R1;<br>25.    Else<br>26.        R2= Path rn.start ∪ ShortestPath(Gr,rn.start,qe);<br>27.        R'=argmin R1,2 (Timecost R1 ,Timecost(R2));<br>28.        Path←R';<br>29.    Return Path; |

Figure 9:
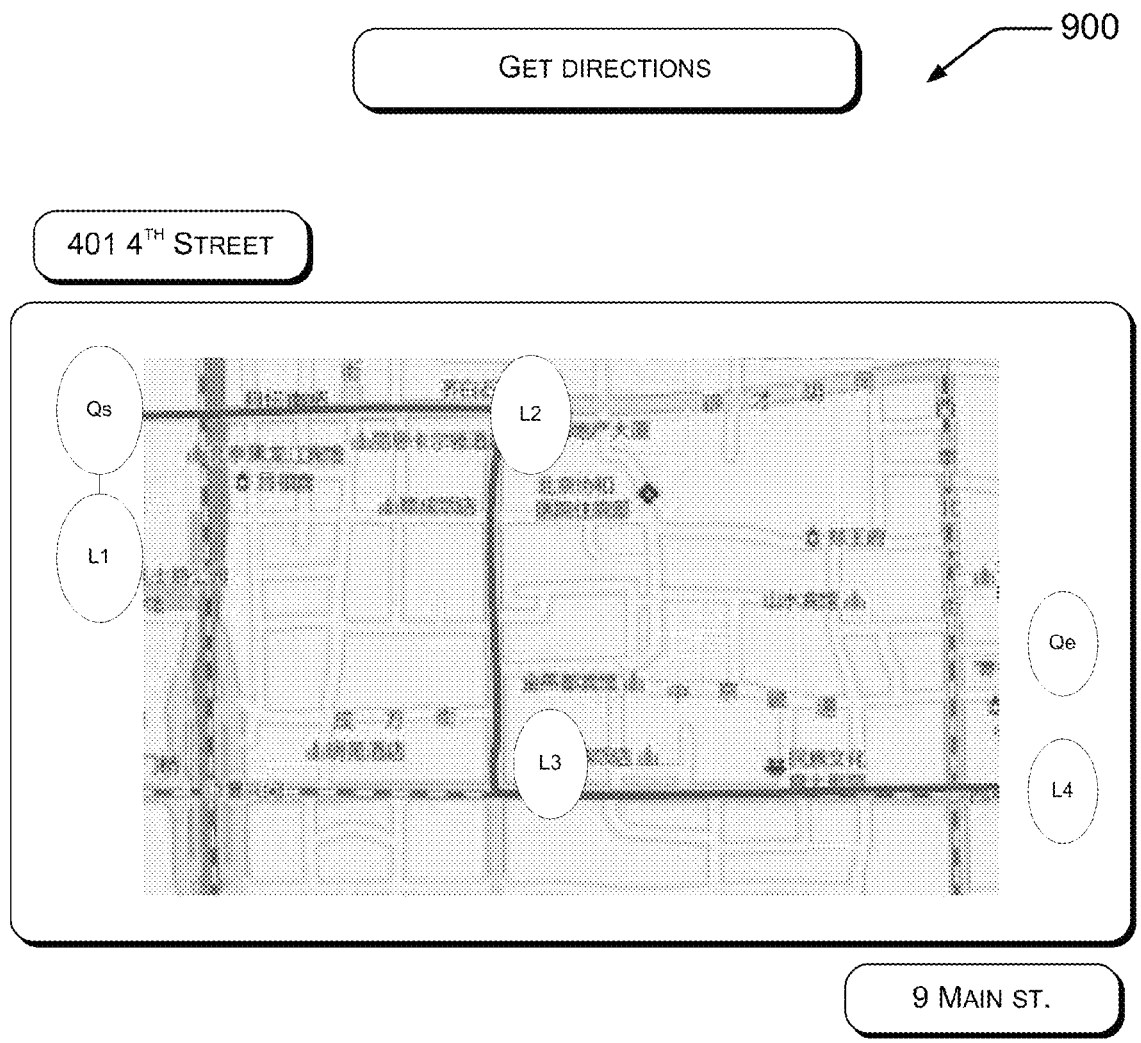
FIG. 9 illustrates an exemplary route plan with landmarks.

The process 600 determines the route or a final fastest path from the starting location to the destination location and visually presents the route to the user 614. The final fastest route may illustrate a nearest landmark to the starting location, various landmarks along the route to guide the user 108, and another nearest landmark to the destination location. An illustration of the route presented to user 108 is shown in FIG. 9.

FIG. 7 illustrates schematic diagrams 700 of the initial routing process 606. As mentioned, the route computation service 106 searches the landmark graph based on trajectories 702. Shown are seven road segments (r1, r2, . . . r7) that are specified as landmarks based on the trajectories. A corresponding landmark graph of the road network is shown in 704. The number shown on each landmark edge denotes a median time cost for travelling from one vertex (landmark) to another vertex (landmark). These are learned from the trajectories in the phase of landmark graph construction.

As previously mentioned, the nearest landmarks to the starting and destination locations are based on inputting a number for m landmarks. Shown at 704 are a variable number of landmarks close to the starting location. In an implementation, the input is m=2, the process identifies two landmarks nearest the starting location, which may be r1 and r2. The process also identifies the two landmarks nearest the ending location, which may be r6 and r7. There are four pairs of starting and ending landmarks. For each pair of start and end points, the route computation service 106 computes the fastest path or route 608 by using the shortest path algorithm. As mentioned, the process selects the route with the least time cost. The time costs for travelling from the starting location to the destination location to their nearest landmarks are estimated in terms of speed constraints of the road networks.

The initial route 706 is a result of finding the route with the least time cost. The time costs are estimated in terms of speed constraints of the road networks. Referring back to 704, at qs (query start point), the median of travel time cost is 0.3 from qs to r2 and 0.4 from qs to r1.

Figure 8:
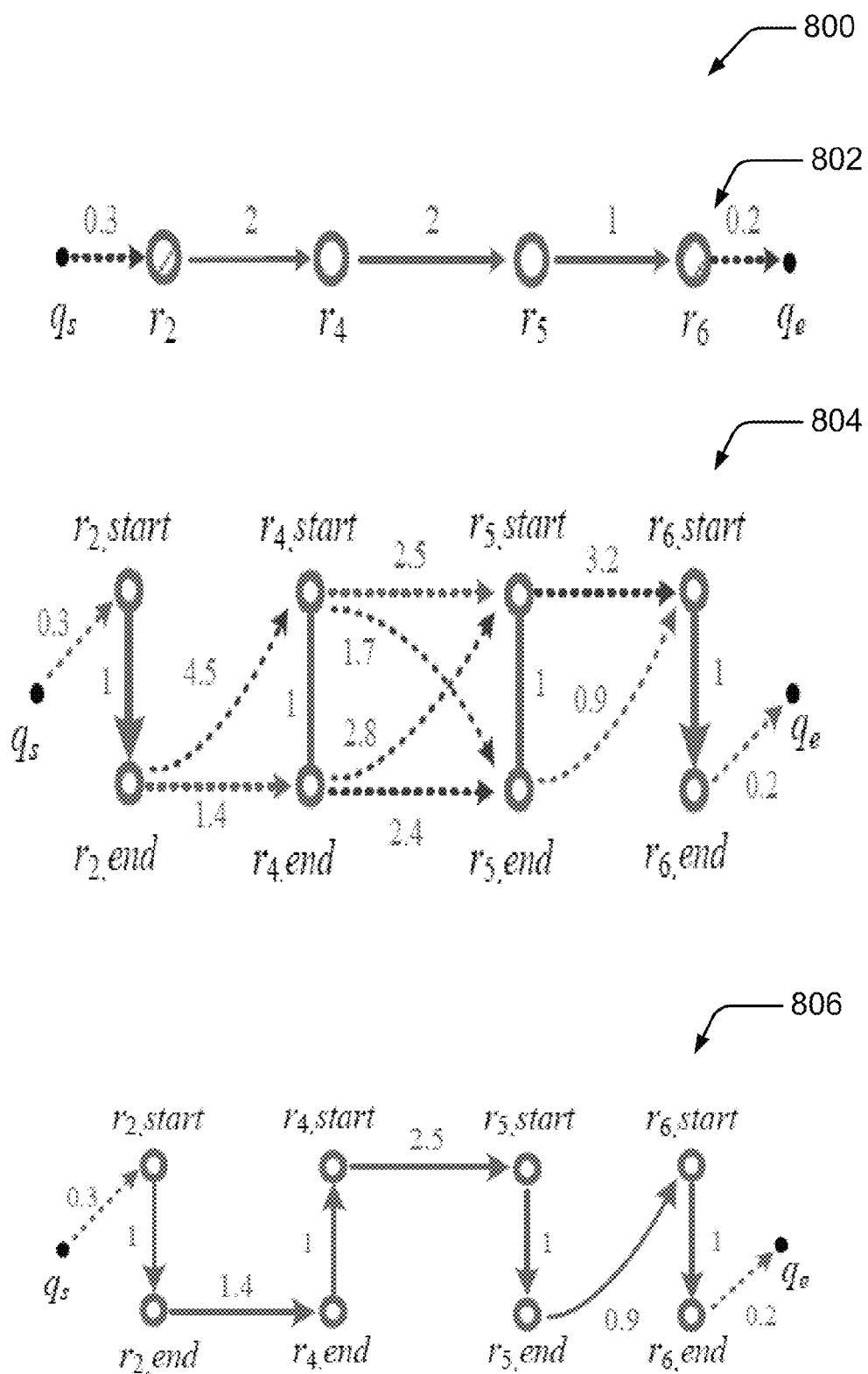
FIG. 8 illustrates an exemplary process of refining the initial route to generate a route in response to user input.

FIG. 8 illustrates an exemplary process 800 for refined routing 612. Steps are calculated for the fastest path from the start point $q_s$ to each terminal point of the landmarks of the initial route 802. For instance, the fastest path from qs to r4.end is coined as Path(r4.end). Shown along the top are true time costs learned from the trajectories.

Shown at 804, because r2 is a one-way road segment, the process will calculate the fastest path from qs to r2.start over the road network by employing the shortest path algorithm. However, the fastest path from ps to r2.start does not pass r2.end. Thus, the calculations may include, Path(r2.end)=qs→r2.start→r2.end=0.3+1=1.3.

The refinement routing process continues to compute the detailed fastest paths shown at 806. Starting from r2.end to r4.start and r4.end, respectively, as r4 is bidirectional. The fastest path from r2.end to r4.end does not pass r4.start, and from r2.end to r4.start does not pass r4.end. Therefore, Path (r4.start)=Path(r2.end)→r4.end→r4.start=1.3+1.4+1=3.7. Path(r4.end)=Path(r2.end)→r4.start→r4.end=1.3+4.5+ 1=6.8. These may be computed in parallel to speed up the process.

The process continues to search for the fastest paths for each pair of terminal points of r4 and r5, as both are bidirectional segments. Using the strategy of dynamic programming, it is easy to compute in parallel that:

Path($r5$.start)=Path($r4$.start)→$r5$.end→$r5$.start=3.7+ 1.7+1=6.4,

Path($r5$.end)=Pat ($r4$.start)→$r5$.start→$r5$.end=3.7+ 2.5+1=7.2.

As r2 is a one-way road segment, it is not necessary to compute the shortest path from r5.end or r5.start to r6.end.

Path($r6$.start)=Path($r5$.end)→$r6$.start=7.2+0.9=8.1.

Path($pe$)=Path($r6$.start)→$r6$.end→$pe$=8.1+1+0.2=9.3.

The time cost of the refined route connecting the terminal points of the two landmarks (e.g., r2.start→4.end) is estimated according to the speed constraints of the road networks. As these constraints are ideal values, they may be smaller than the true time cost learned from the trajectories (shown at 802).

As discussed above, certain acts in processes 200-400, and 600 need not be performed in the order described, may be modified and/or may be omitted entirely, depending on the circumstances.

FIG. 9 is a schematic diagram showing an exemplary route 900 as computed by the route computation service 106 and presented to the user 108 on the user interface 110. As mentioned, the route 900 from the route computation service 106 may be provided by a network service provider, a web application, an application based on a live search map, an application stored in memory of a computing device, and the like.

Exemplary Server Implementation

Figure 10:
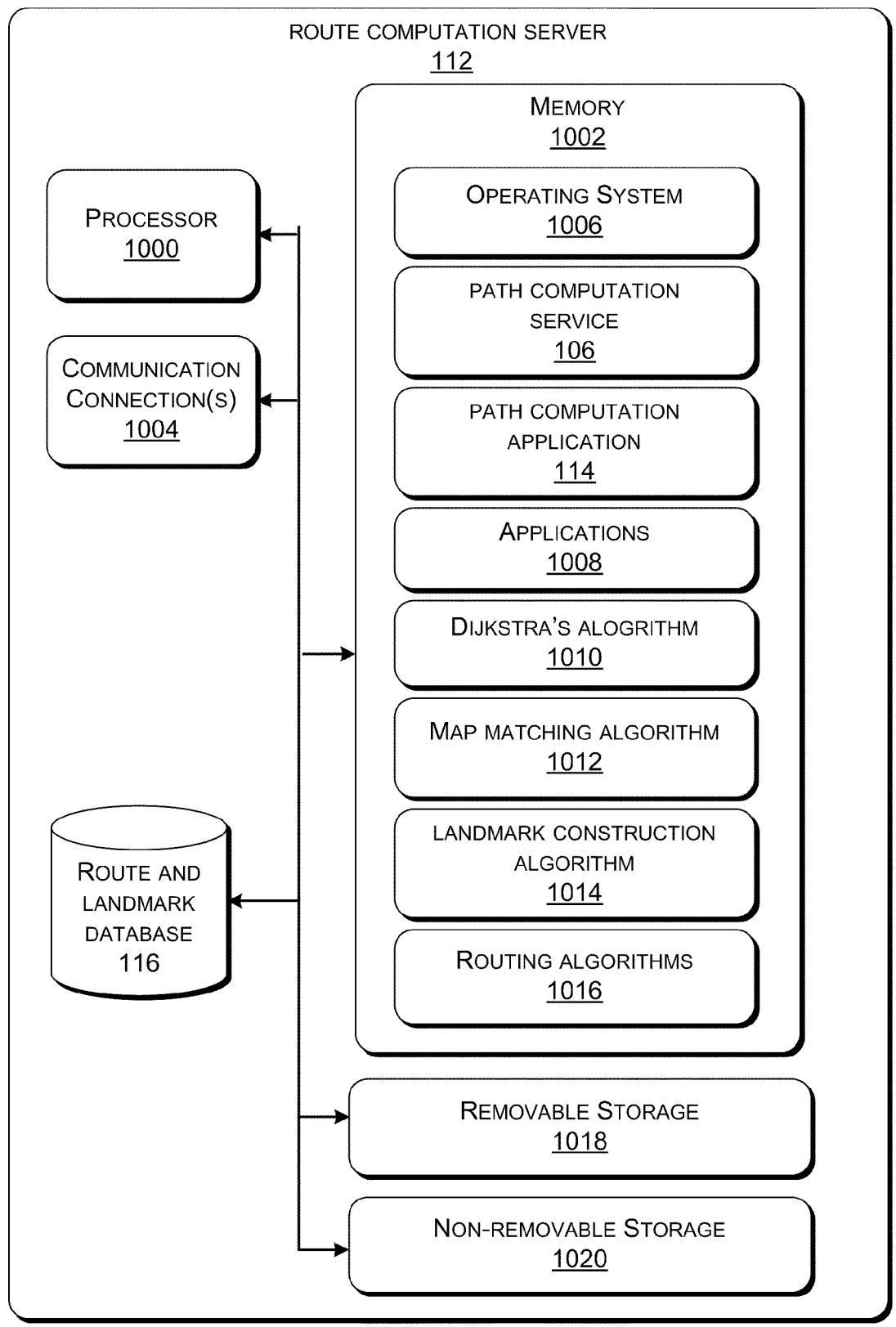
FIG. 10 is a block diagram showing an exemplary server usable with the environment of FIG. 1.

FIG. 10 is a block diagram showing an exemplary server 112 to be used for the route computation service 106 and/or the route computation application 114. The server 112 may be configured as any suitable system capable of services, which includes, but is not limited to, implementing the route computation service 106 for map-based services, such as provide driving directions with landmarks. In one exemplary configuration, the server 112 comprises at least one processor 1000, a memory 1002, and a communication connection(s) 1004. The communication connection(s) 1004 may include access to a wide area network (WAN) module, a local area network module (e.g., WiFi), a personal area network module (e.g., Bluetooth), and/or any other suitable communication modules to allow the server 112 to communicate over the network(s) 104.

Turning to the contents of the memory 1002 in more detail, the memory 1002 may store an operating system 1006, the route computation service module 106a, the route computation application or module 114, and one or more applications 1008 for implementing all or a part of applications and/or services using the route computation service 106.

The one or more other applications 1008 or modules may include an email application, online services, a calendar application, a navigation module, a game, and the like. The memory 1002 in this implementation may also include Dijkstra's algorithm 1010, a map matching algorithm 1012, a landmark construction algorithm 1014, and routing algorithms 1016.

Dijkstra's algorithm 1010 determines a shortest path when there are pairs of starting points and ending points, close to nearest potential landmarks. It will find vertices of shortest paths. The map matching algorithm 1012 associates each route-oriented vehicle trajectory to a corresponding road segment. This algorithm 1012 finds the best match when given a road network and a trajectory as input. As mentioned, the map matching algorithm 1012 evaluates road segment candidates, determines observation and transmission probabilities, measures a distance between actual average speed and speed constraints of the path, and finds a best matching path for a trajectory. The landmark construction algorithm 1014 builds a landmark graph based on input of a road network, a trajectory information from archive or the route and landmark database 116, a number of landmarks, and a threshold for determining the edge support.

The memory 1002 in this implementation may also include routing algorithms 1016. The routing algorithms 1016 include the initial routing algorithm which uses the landmark graph, the starting point and the destination points nearest landmarks of start and destination as the input. As a result, the initial routing algorithm outputs a fast path on the landmark graph. The routing algorithms may also include the refined routing algorithm. The input may include the road network, the start point and the destination point of user-specified query, and initial routing result. The output is a refined fast route.

The server 112 may include the route and landmark database to store the collection of GPS logs, trajectories, landmark graphs, initial routes, and the like. Alternatively, this information may be stored on other databases The server 112 may also include additional removable storage 1018 and/or non-removable storage 1020. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented at least partially by a processor, the method comprising:
   collecting a sequence of global positioning system (GPS) points from route-oriented vehicle logs;
   identifying geographical locations from the route-oriented vehicle logs, the geographical locations representing locations where route-oriented vehicles travelled as recorded in the vehicle logs;
   extracting route-oriented vehicle trajectories from the route-oriented vehicle logs, the route-oriented vehicle trajectories representing individual trips; and
   constructing a landmark graph based at least in part on the route-oriented vehicle trajectories by:
      associating each route-oriented vehicle trajectory to a corresponding road segment;
      determining a first frequency that a first road segment is visited by the route-oriented vehicles and at least a second frequency that other road segments are visited by the route-oriented vehicles, the first frequency being determined based on a number of the route-oriented vehicle trajectories that are associated with the first road segment, and the second frequency being determined based on a number of the route-oriented vehicle trajectories that are associated with the other road segments;
      comparing the first frequency to the second frequency; and
      identifying a landmark, the landmark being the first road segment when the first frequency is greater than the second frequency.

2. The method of claim 1, wherein the first road segment is a directed edge that is associated with a direction symbol, two terminal points, and a list of intermediate points describing the road segment with a polyline.

3. The method of claim 1, further comprising:
   determining whether a time interval between two consecutive GPS points meets or exceeds a predetermined threshold; and
   partitioning the two consecutive GPS points into two different trajectories based on whether the time interval between the two consecutive GPS points meets or exceeds the threshold.

4. The method of claim 1, further comprising dividing the route-oriented vehicle trajectories into separate trajectories when a stay point is identified, the stay point representing a geographical region in which a route-oriented vehicle remained within a threshold distance for a threshold time period.

5. The method of claim 1, wherein the associating each route-oriented vehicle trajectory to a corresponding road segment comprises:
   identifying candidate road segments and correlating the candidate road segments to candidate projection points;
   detecting the candidate projection points on candidate edges;
   identifying a probability that a GPS point matches a candidate point computed based on a distance between two points;
   identifying a list of road segments based on determining a shortest path from a first candidate projection point to a second candidate projection point;
   generating a candidate graph for the route-oriented vehicle trajectory with a set of candidate projection points and a set of edges to represent the shortest paths between neighboring candidate points; and
   determining a road segment that matches the trajectory.

6. The method of claim 1, wherein the constructing the landmark graph further comprises:
   computing a number of route-oriented vehicle trajectories that connect any of the landmarks; and
   connecting the landmarks with a landmark edge when there is at least a subset of the route-oriented vehicle trajectories passing through the landmarks, the landmark edge to represent travels between the landmarks by the route-oriented vehicles.

7. The method of claim 1, further comprising:
   determining a median time cost for travelling on a landmark edge, the landmark edge to connect one landmark to another landmark.

8. The method of claim 1, further comprising:
   receiving a user query with a starting point and a destination point for directions;
   searching the landmark graph for an initial route that is represented by a sequence of landmarks with corresponding transition times and a least amount of travel time;
   computing a set of connected road segments between each pair of consecutive landmarks of an initial route; and
   providing data indicating a route including the directions with landmarks from the starting point to the destination point.

9. One or more computer-readable media encoded with instructions that, when executed by a processor, perform acts comprising:
   presenting a user interface on a display of a portable electronic device, the user interface to access a service application that provides map-based services;
   receiving user input to the user interface indicating a starting location and a destination location;
   accessing a landmark graph constructed from route-oriented vehicle trajectories, a landmark being identified when a first frequency of route-oriented vehicles visiting a road segment is compared to a second frequency of route-oriented vehicles visiting a second or subsequent road segment and the first frequency is greater than the second frequency;
   computing an initial path, based on the starting location and the destination location, between each pair of consecutive landmarks of the initial path; and refining the initial path by finding a route that sequentially connects the landmarks, from the starting location to the destination location.

10. The computer-readable media of claim 9, in response to the initial path, further comprising:
calculating additional paths from the starting location to each terminal point of the landmarks on the initial path; and
determining the additional paths for unidirectional and bidirectional road segments.

11. The computer-readable media of claim 9, further comprising:
searching the landmark graph for the initial path based on a sequence of landmarks with corresponding transition times between the landmarks and a least amount of travel time; and
visually presenting the route to a user, the route illustrating a nearest landmark to the starting location, any landmarks along the route, and another nearest landmark to the destination location.

12. The computer-readable media of claim 9, further comprising:
collecting the route-oriented vehicle logs that include a sequence of global positioning system (GPS) points from the variety of route-oriented vehicles;
determining geographical locations from the route-oriented vehicle logs, the geographical locations to represent regions where the variety of route-oriented vehicles have travelled as recorded in the vehicle logs; and
segmenting the geographical locations into the road segments, a road segment including a directed edge that is associated with a direction symbol, two terminal points, and a list of intermediate points describing the road segment with a polyline.

13. The computer-readable media of claim 9, further comprising:
extracting route-oriented vehicle trajectories from route-oriented vehicle logs, the route-oriented vehicle logs are represented with a sequence of global positioning system (GPS) points from the variety of route-oriented vehicles engaged in business related transportation;
representing individual trips based on a sequence of road segments with transition times with route-oriented vehicle trajectories;
determining when a time interval between two consecutive GPS points is greater than or less than a predetermined threshold:
in an event that the time interval between two consecutive GPS points is greater the predetermined threshold, partition the two consecutive GPS points into two different trajectories; or
in an event that the time interval between the two consecutive GPS points is less than the predetermined threshold, use the two consecutive GPS points in a trajectory.

14. The computer-readable media of claim 9, further comprising determining when to partition route-oriented vehicle logs into the route-oriented vehicle trajectories based on a stay point, the stay point represents a geographical region in which the route-oriented vehicle remained within a threshold distance for a threshold time period.

15. The computer-readable media of claim 9, further comprising constructing the landmark graph based at least in part on the route-oriented vehicle trajectories by:
matching each route-oriented vehicle trajectory to a corresponding road segment;
representing the landmark as a vertex on the landmark graph; and
connecting at least two vertices with a landmark edge, the landmark edge to represent travels between the at least two vertices by at least a subset of the variety of route-oriented vehicles by a number of times greater than a threshold.

16. A system comprising:
a memory;
one or more processors coupled to the memory having instructions to perform acts comprising:
receiving user input indicating a starting location, a destination location, and a time of day and a category of day;
accessing a landmark graph stored in a database, the landmark graph identifying landmarks on the landmark graph, landmarks being identified as road segments having a threshold frequency of visits by a variety of vehicles, the threshold frequency being greater than the frequency of visits by a variety of vehicles on other road segments;
searching the landmark graph for an initial route based on a sequence of landmarks and a least amount of travel time based at least in part on the starting location and the destination location;
calculating an initial path between each pair of consecutive landmarks of the initial route; and
presenting the initial route with nearest landmark to the starting location, landmarks along the route, and another nearest landmark to the destination location for the time of day and the category of day as specified.

17. The system of claim 16, further comprising:
collecting vehicle logs, which include a sequence of global positioning system (GPS) points from the variety of vehicles;
extracting vehicle trajectories from the vehicle logs, the vehicle trajectories representing individual trips made by the variety of vehicles;
partitioning the vehicle trajectories made by the variety of vehicles into multiple partitions according to times of day and categories of days; and
generating landmark graphs of landmarks for each of the multiple partitions, wherein the accessing accesses the landmark graph associated with the time of day and the category of day.

18. The system of claim 16, further comprising partitioning the vehicle trajectories into multiple parts based on a time of a day and a category of day.

19. The system of claim 16, further comprising computing paths between each pair of consecutive landmarks of the initial route, a path is a set of connected road segments.

20. The system of claim 16, further comprising:
associating each vehicle trajectory to a corresponding road segment; and
specifying a road segment visited at a greater frequency relative to another road segment as a landmark, the greater frequency being determined based on a number of vehicle logs for the landmark.

* * * * *